US 6,690,894 B2

(12) United States Patent
Ho et al.

(10) Patent No.: US 6,690,894 B2
(45) Date of Patent: Feb. 10, 2004

(54) MULTILEVEL OPTICAL SIGNALS OPTIMIZED FOR SYSTEMS HAVING SIGNAL-DEPENDENT AND SIGNAL-INDEPENDENT NOISES, FINITE TRANSMITTER EXTINCTION RATIO AND INTERSYMBOL INTERFERENCE

(75) Inventors: Keangpo Ho, San Jose, CA (US); Joseph Mardell Kahn, San Carlos, CA (US)

(73) Assignee: StrataLight Communications, Inc., Campbell, CA (US)

( * ) Notice: Subject to any disclaimer, the term of this patent is extended or adjusted under 35 U.S.C. 154(b) by 227 days.

(21) Appl. No.: 09/855,642

(22) Filed: May 14, 2001

(65) Prior Publication Data

US 2003/0223762 A1 Dec. 4, 2003

(51) Int. Cl.$^7$ ............................................... H04B 10/04
(52) U.S. Cl. .................... 398/183; 398/192; 398/186
(58) Field of Search ................................. 359/181, 184, 359/185, 187, 180; 375/286, 287; 380/54

(56) References Cited

U.S. PATENT DOCUMENTS

| | | | | |
|---|---|---|---|---|
| 3,714,437 | A | * 1/1973 | Kinsel | 359/185 |
| 4,455,617 | A | 6/1984 | Dolikian | 364/724 |
| 5,337,180 | A | 8/1994 | Woods et al. | 359/568 |
| 5,510,919 | A | 4/1996 | Wedding | 359/115 |
| 5,774,242 | A | 6/1998 | O'Sullivan et al. | 359/110 |
| 5,822,094 | A | * 10/1998 | O'Sullivan et al. | 359/110 |
| 6,377,640 | B2 | 4/2002 | Trans | 375/354 |

OTHER PUBLICATIONS

Walkin & Conradi, "Multilevel Signaling for Increasing the Reach of 10 Gb/s Lightwave Systems", Journal of Lightwave Technology, vol. 17, No. 11, pp. 2235–2248, IEEE, Nov. 1999.*

Rebola, J.L. & Cartaxo, A.V.T., "On the Quaternary Level Spacing Signalling Optimisation for Increasing the Transmission Distance in Optical Communication Systems", $3^a$ Conferencia National de Telecommunicacoes, Figueira da Foz, Portugal, Apr. 23–24 2001, pp. 514–518.

Rebola, J.L. & Cartaxo, A.V.T., "Optimization of Level Spacing in Quaternary Optical Communication Systems", Proceedings of the SPIE–International Society for Optical Engineering, vol. 4087, (Applications of the Photonic Technology 4, Quebec City, Que., Canada, Jun. 12–16, 2000, SPIE—Int. Soc. Opt. Eng., 2000, pp. 49–59.

Walkin & Conradi, "Multilevel Signaling for Increasing the Reach of 10 Gb/s Lightwave Systems", Journal of Lightwave Technology, vol. 17, No. 11, pp. 2235–2248, IEEE, Nov. 1999.

Uyematsu, Kinuchi & Sakaniwa, "Trellis Coded Modulation for Multilevel Photon Communication", Singapore ICCS/ISITA, pp. 582–587, IEEE, 1992.

* cited by examiner

Primary Examiner—Jason Chan
Assistant Examiner—David C Payne
(74) Attorney, Agent, or Firm—David R. Gildea

(57) ABSTRACT

Methods and apparatus are described to transmit and receive information encoded in multilevel optical signals that take on at least three intensity levels. Intensity levels of a transmitted multilevel optical signal are optimized to minimize a transmitted optical power required to achieve a specified decision error probability, taking account of an arbitrary admixture of impairments, including signal-dependent noise, signal-independent noise, a finite transmitter extinction ratio, and intersymbol interference. The optimizations described are implemented using analytical or numerical techniques, depending on the admixture of impairments, and can be used to achieve equal or unequal decision error probabilities at a set of decision thresholds.

66 Claims, 11 Drawing Sheets

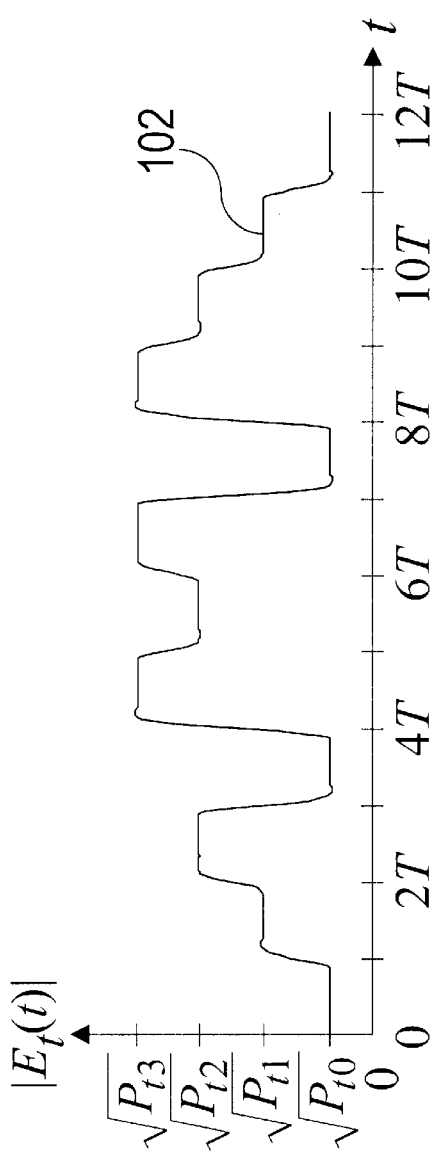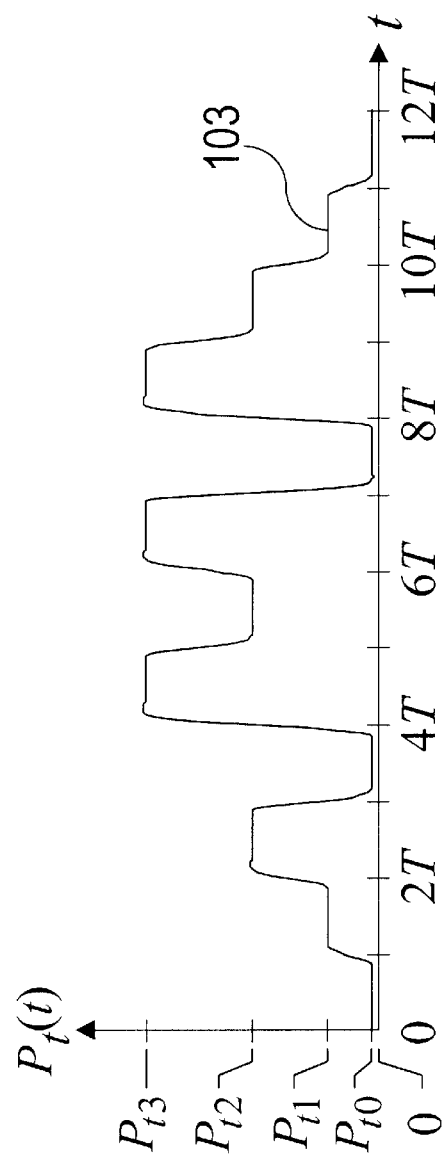
FIG. 4a
FIG. 4b

MULTILEVEL OPTICAL SIGNALS OPTIMIZED FOR SYSTEMS HAVING SIGNAL-DEPENDENT AND SIGNAL-INDEPENDENT NOISES, FINITE TRANSMITTER EXTINCTION RATIO AND INTERSYMBOL INTERFERENCE

BACKGROUND OF THE INVENTION

1. Field of the Invention

The invention relates generally to optical communication systems and, more particularly, to transmission and reception of multilevel optical signals designed to maximize power efficiency in the presence of signal-dependent and signal-independent noises, finite transmitter extinction ratio, and intersymbol interference (ISI).

2. Description of the Related Art

It is well known that in optical communication systems, encoding digital information in multilevel optical signals is more bandwidth-efficient than encoding the information in binary signals. As compared to binary signals, multilevel optical signals have longer symbol duration and have narrower spectra (both in the optical domain and in the electrical domain, after detection at a receiver). These attributes of multilevel signals increase immunity to ISI, increase spectral efficiency in wavelength-division-multiplexed systems, and relax the bandwidth requirements of optical and electrical components in the transmitter, receiver and intervening optical transmission medium.

Most practical optical receivers detect the intensity of a received optical signal, typically using direct detection. In this description, we restrict our attention to multilevel signals having at least three distinct intensity levels. The multilevel signals we consider may also have arbitrary phase and/or frequency modulation, whether intentional (e.g., correlative line encoding for spectral narrowing) or unintentional (e.g., due to chirp of a directly modulated transmitter laser).

It is well known that optical communication systems may exhibit various impairments, including several types of signal-dependent noise, several types of signal-independent noise, a finite transmitter extinction ratio, and ISI. When signal-dependent noise is present, typically, higher intensity levels are received with more noise than lower intensity levels. An important example is signal-spontaneous beat noise, whose variance is proportional to received signal intensity. Another common example is transmitter intensity noise, whose variance is proportional to the square of received signal intensity. In the presence of signal-dependent noise, if a transmitted signal has equally spaced intensity levels, at the receiver, decisions at thresholds between higher intensity levels are subject to higher error probability than decisions at thresholds between lower intensity levels. This implies that the use of equally spaced intensity levels does not yield the lowest overall error probability for a given transmitted power or, equivalently, does not permit the lowest transmitted power yielding a desired overall error probability. When signal-dependent noise is present, it is desirable to transmit signals having unequally spaced intensity levels chosen so that the decisions at all thresholds achieve substantially equal error probabilities. This minimizes the overall error probability for a given transmit power or, equivalently, minimizes the transmitted power required to achieve a desired overall error probability. To achieve optimized performance, these intensity levels should be chosen taken account of several key impairments, including signal-dependent noise, signal-independent noise, a finite transmitter extinction ratio, and ISI.

Kinsel in U.S. Pat. No. 3,774,437 described the use of unequally spaced intensity levels to improve performance in the presence of signal-dependent noise, background light and photodetector leakage current, but did not describe how to choose the intensity levels to optimize performance in the face of specific impairments. Uyematsu, Kikuchi and Sakaniwa in a paper entitled "Trellis Coded Modulation for Multilevel Photon Communication System" presented at ICCS/ISITA in 1992 described the optimal intensity levels for use with 4-ary pulse-amplitude modulation (4-PAM) in the presence of signal shot noise, background light and photodetector leakage current. Walkin and Conradi in a paper entitled "Multilevel Signaling for Increasing the Reach of 10 Gb/s Lightwave Systems" published by the Journal of Lightwave Technology in November, 1999, discussed how to design the optimal intensity levels in a 4-PAM system in two particular cases. First, they described the optimal levels when the only significant impairment is signal-spontaneous beat noise, which has a variance proportional to the intensity. In this case, they did not treat other important impairments, such as other forms of signal-dependent noise, signal-independent noise, finite transmitter extinction ratio, or ISI. Second, they described the optimal levels when the only significant impairments are transmitter intensity noise (which has a variance proportional to the square of the intensity) and finite transmitter extinction ratio. In this case, however, they did not consider other key impairments, including other forms of signal-dependent noise, signal-independent noise, or ISI.

There is a need for methods and apparatus to transmit multilevel optical signals having intensity levels designed taking account of arbitrary admixtures of key impairments, including: one or more types of signal-dependent noises, whose variances exhibit various dependencies on intensity; signal-independent noise; finite transmitter extinction ratio; and ISI. These methods and apparatus should employ analytical and/or numerical techniques to design the levels, as appropriate for the admixture of impairments encountered in a particular system. These methods and apparatus should be usable in conjunction with offline and/or online determination of a system's impairments. These methods and apparatus should be capable of achieving specified equal or unequal error probabilities at different decision thresholds.

SUMMARY OF THE INVENTION

It is therefore an object of the present invention to provide methods and apparatus to transmit multilevel optical signals having intensity levels designed taking account of an admixture of relevant impairments.

Another object of the present invention is to provide methods and apparatus to transmit multilevel optical signals having intensity levels designed to take into account one or more types of signal-dependent noises whose variances exhibit various dependencies on intensity; signal-independent noise; finite transmitter extinction ratio; and ISI.

Another object is to provide methods and apparatus to optimize the intensity levels using analytical and/or numerical techniques, as appropriate for the admixture of impairments encountered in a particular system.

Another object is to provide methods and apparatus to optimize the intensity levels in conjunction with offline and/or online determination of a system's impairments.

Another object is to provide methods and apparatus to optimize the intensity levels to achieve specified equal or unequal error probabilities at different decision thresholds.

The above objects of the invention, among others, either singly or in combination, are obtained by the present invention, which includes a transmitter that encodes a transmitted information bit stream in a transmitted multilevel optical signal. A multilevel optical signal is an optical signal whose intensity (instantaneous power) is a pulse-amplitude modulation (PAM) signal assuming at least three levels. The transmitted multilevel optical signal has a set of M transmitted intensity levels $P_{t,k}$, k=0, ..., M−1, where M≧3, and is characterized by an extinction ratio parameter $\delta = P_{t,0}/P_{t,M-1}$. The transmitter launches the transmitted multilevel optical signal into an optical transmission medium, which typically includes optical amplifiers to compensate for loss. A received multilevel optical is received through the optical transmission medium. The received multilevel optical signal has a set of M received intensity levels $P_k$, k=0, ..., M−1. The set of received intensity levels is a scaled version of the set of transmitted intensity levels.

The received multilevel optical signal is input to a receiver, which typically includes an optical preamplifier having a gain G to amplify the received optical signal. At the optical preamplifier output, the amplified multilevel optical signal includes amplified spontaneous emission (ASE) from the optical preamplifier and from optical amplifiers in the optical transmission medium. The amplified multilevel optical signal is passed through an optical bandpass filter to band limit the received ASE, and the filter output is incident upon a photodetector having a responsivity R, whose output is a received photocurrent. The received photocurrent is a multilevel signal having a set of M received photocurrent levels $I_k$, k=0, ..., M−1; this set is a scaled version of the set of M received intensity levels. The received photocurrent is amplified by an electrical preamplifier, which outputs a multilevel electrical signal having a set of M levels that is a scaled version of the set of M received photocurrent levels. The multilevel electrical signal includes several noise components; when the received multilevel optical signal takes on intensity level $P_k$ and the received photocurrent takes on level $I_k$, the noise components have a variance (referred to the electrical preamplifier input) $\sigma_k^2 = \sigma_{ind}^2 + \gamma P_k$. The variance includes a signal-independent term $\sigma_{ind}^2$, which is dominated typically by electronic noise in the electrical preamplifier. The variance also includes a signal-dependent term $\gamma P_k$, which is dominated typically by a beat term between the received multilevel optical signal and the received ASE.

A multilevel decoder compares the multilevel electrical signal to a set of M−1 thresholds $I_{th,k} = (\sigma_k I_{k-1} + \sigma_{k-1} I_k)/(\sigma_{k-1} + \sigma_k)$, k=1, ... M−1, and makes decisions to estimate the transmitted information bit stream. Because of noise, decisions are subject to errors. The error probabilities at the M−1 thresholds are characterized by the set of (M−1) Q factors $Q_k = (I_k - I_{k-1})/(\sigma_k + \sigma_{k-1})$, k=1, ..., M−1.

A set of optimized received intensity levels, which minimize a received average optical power $$P_{av} = \left(\frac{1}{M}\right)\sum_{k=0}^{M-1} P_k$$

required so that all (M−1) Q factors $Q_k$, k=1, ..., M−1 achieve a required value Q, is determined by a level-setting algorithm as follows. A parameter describing the relative strength of signal-independent and signal-dependent noises is defined: $\rho_{ind} = \sigma_{ind}^2/\gamma$, and a parameter proportional to the required Q factor is defined: $C = Q\sqrt{\gamma}/RG$. The set of optimized received intensity levels is then determined using:

$$P_{M-1} = \frac{(M-1)C[(1+\delta)(M-1)C + 2(\rho_{ind}(1-\delta)^2 + \delta(M-1)^2 C^2)^{\frac{1}{2}}]}{(1-\delta)^2}, \text{ and:}$$

$$P_k = \left(kC + \sqrt{\rho_{ind} + \delta \cdot P_{M-1}}\right)^2 - \rho_{ind}, k = 0 \ldots, M-2.$$

The optimized received intensity levels depend on M, the required Q factor, the relative strength of signal-independent and signal-dependent noises, and the transmitter extinction ratio parameter. The set of optimized received intensity levels is scaled appropriately to obtain a set of optimized transmitted intensity levels.

An advantage of the present invention is that it can optimize the power efficiency of multilevel optical signals taking account of a wide range of system impairments, including: one or more types of signal-dependent noise exhibiting various dependencies on intensity; signal-independent noise; finite transmitter extinction ratio; and ISI.

Another advantage of the present invention is that it optimize the power efficiency of multilevel optical signals to achieve various objectives; specifically, the present invention can minimize the received power required to achieve specified equal or unequal error probabilities at different decision thresholds, or can minimize the error probabilities at different decision thresholds subject to a limit on received power.

Another advantage of the present invention is that it can optimize the power efficiency of multilevel optical signals based on offline or online determination of a system's impairments.

Another advantage of the present invention is that it improves the power efficiency of multilevel optical signals, yielding several potential benefits, including: an increased transmission distance, an increased system power margin, and a reduced optical power launched into an optical transmission medium, the latter potentially reducing the impact of optical nonlinearities in the optical transmission medium.

Another advantage of the present invention is that it improves the power efficiency of multilevel optical signals, enabling realization of all the attendant advantages of multilevel signals, including a longer symbol duration and a narrower spectrum, thereby increasing immunity to ISI, increasing spectral efficiency in wavelength-division-multiplexed systems, and relaxing bandwidth requirements of optical and electrical components in transmitters, receivers and intervening optical transmission media.

These and other objects and advantages of the present invention will no doubt become obvious to those of ordinary skill in the art after having read the following detailed description of the preferred embodiments, which are illustrated in the various figures.

BRIEF DESCRIPTION OF THE DRAWINGS

FIG. 4a is a waveform of a magnitude of a transmitted optical electric field having four intensity levels optimized under the present invention for a particular set of system parameters;

FIG. 4b is a waveform of a transmitted optical intensity for the transmitted optical electric field of FIG. 4a;

FIG. 4c is a waveform of a received optical intensity for the transmitted optical electric field of FIG. 4a;

FIG. 4d is a waveform of a received photocurrent for the transmitted optical electric field of FIG. 4a;

DETAILED DESCRIPTION OF THE PREFERRED EMBODIMENTS

Figure 1:
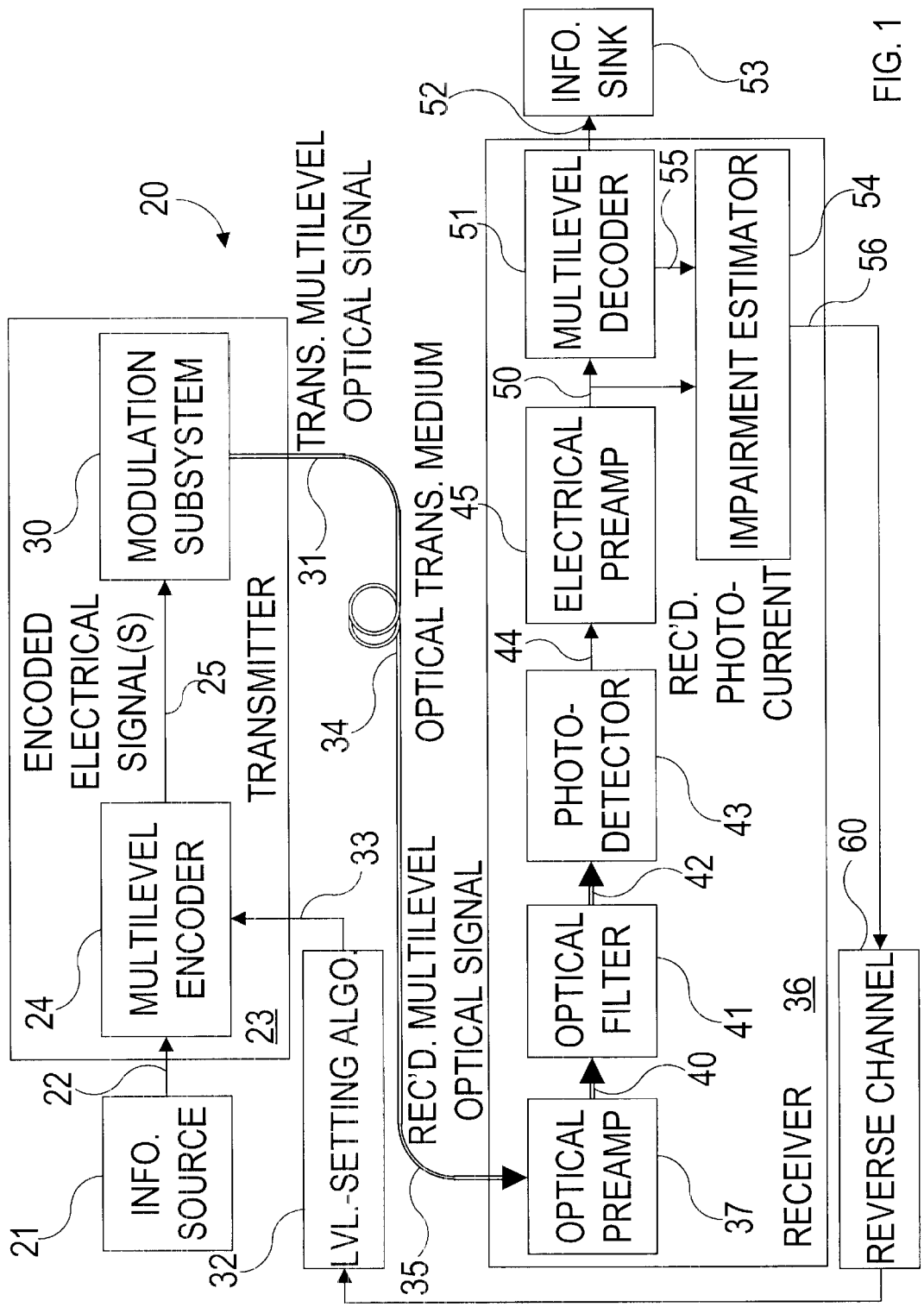
FIG. 1 is an optical communication system, including a transmitter transmitting multilevel signals, a level-setting algorithm for optimizing the multilevel signals under the present invention, an optical transmission medium, and a receiver for decoding received multilevel signals and for estimating noise and other system impairments.

FIG. 1 is a representative optical communication system transmitting multilevel signals optimized under the present invention, and is given the general reference number 20. An information source (info. source) 21 outputs an information bit stream 22 to an optical transmitter 23. In the transmitter 23, the information bit stream 22 is encoded by a multilevel encoder 24 into one or more encoded electrical signal(s) 25. A modulation subsystem 30, which may include a laser (or other light source), one or more modulators, and appropriate drivers, receives the encoded electrical signal(s) 25 and issues a transmitted multilevel optical signal 31 representative of the information bit stream 22. Throughout this description, the term "multilevel optical signal" refers to an optical signal whose intensity (instantaneous optical power) is a pulse-amplitude-modulation (PAM) signal that assumes at least three distinct levels. A level-setting algorithm (lvl.-setting algo.) shown generally with a reference identifier 32 and in specific cases with reference identifiers 32a–e determines an optimized set of intensity levels for the transmitted multilevel optical signal 31, and passes level-setting information 33 to the multilevel encoder 24.

The transmitted multilevel optical signal 31 is launched into an optical transmission medium 34, whose output is a received multilevel optical signal 35. The transmission medium 34 may include fiber, multiplexers, demultiplexers, filters and other passive optical media, as well as optical amplifiers and other active optical media. For example, a typical long-haul transmission system includes multiple lossy fiber spans and multiple in-line optical amplifiers to compensate the fiber loss.

The received signal 35 is input to a receiver 36, within which it is amplified by an optical preamplifier (preamp) 37 to provide a preamplified optical signal 40. The preamplified optical signal 40 includes optical noise from amplified spontaneous emission (ASE) originating in the optical preamplifier 37 and in optical amplifiers in the optical transmission medium 34. This ASE beats with the signal component of the preamplified optical signal 40, leading to signal-spontaneous beat noise, a signal-dependent noise that is often the dominant noise in systems using optical amplifiers. The preamplified optical signal 40 passes through an optical bandpass filter 41 to band limit its ASE component and issues as a filtered optical signal 42 to a photodetector 43. The photodetector 43 yields a received photocurrent 44 that is proportional to the intensity of the filtered optical signal 42. The received photocurrent 44 is amplified by an electrical preamplifier (preamp) 45, whose output is a multilevel electrical signal 50. The multilevel electrical signal 50, including noise components introduced by the electrical preamplifier 45, is received by a multilevel decoder 51. The multilevel decoder 51 compares the multilevel electrical signal 50 to a set of thresholds to obtain 52, an estimate of the information bit stream, which is received by an information sink (info. sink) 53.

Under the present invention, the level-setting algorithm 32 determines an optimized set of intensity levels for the transmitted optical signal 31 taking account of noise, ISI, and other impairments in the system 20. In some embodiments of the invention, relevant impairments can be characterized before the components of the communication system 20 are assembled to comprise the system 20, and the level-setting algorithm 32 can be performed as part of the process of designing and setting up the system 20. In some implementations of the invention, particularly when relevant impairments in the system 20 are subject to uncertainty or variations over time, it is desirable to estimate relevant impairments at the receiver 36 and pass relevant information to the level-setting algorithm 32. Accordingly, within the receiver 36, at least one impairment estimator 54 monitors the multilevel electrical signal 50 and/or one or more other signal(s) 55 extracted from 50 by the multilevel decoder 51 to estimate relevant impairments. An impairment estimator output 56, which comprises relevant information on the impairments, is passed to the level-setting algorithm 32. The level-setting algorithm 32 may be performed at the transmitter 23, in which case, the impairment estimator output 56 is transmitted through a reverse channel 60 to the level-setting algorithm 32 (as shown in FIG. 1). Alternatively, the level-setting algorithm 32 can be performed at the receiver or at some other location(s); in this case, the level-setting information 33 may be transmitted through a reverse channel 60 to the multilevel encoder 24 (this represents a slight variation from FIG. 1).

The system 20 is illustrated and described herein in a manner that describes those components relevant to explaining the present invention. It should be understood, however, that other conventional components for such a system 20 will be needed. Also, a particular optical communication system following the present invention may omit or rearrange one or more components shown in the system 20. For example, in a typical wavelength-division-multiplexed (WDM) fiber system, a plurality of WDM optical signals are amplified by one shared optical preamplifier and are demultiplexed onto a plurality of separate fibers by one shared optical demultiplexer. When interpreting the system 20 in this context, the optical preamplifier 37 represents the shared optical preamplifier, and the bandpass optical filter 41 represents the input-output transfer characteristic of the shared optical demultiplexer for the particular received multilevel optical signal 35 under consideration. As another example, some systems may not employ an optical preamplifier at a receiver; when interpreting the system 20 in this context, we should consider the optical preamplifier 37 to have unit gain.

We will now introduce the notation required to describe the present invention. Throughout this description, optical electric fields are described in terms of their complex baseband equivalents. The transmitted multilevel optical signal 31 can be described in terms of a transmitted optical electric field $E_t(t)$:

$$E_t(t)=|E_t(t)|e^{j\phi_t(t)},\qquad\text{(Eq. 1)}$$

where $|E_t(t)|$ and $\phi_t(t)$ are the magnitude and phase, respectively, of $E_t(t)$. The intensity (i.e., instantaneous power) of the transmitted optical electric field $E_t(t)$ is given by:

$$P_t(y)=|E_t(t)|^{2i}.\qquad\text{(Eq. 2)}$$

The transmitted optical intensity $P_t(t)$ is a PAM signal having symbol interval T and symbol rate 1/T. During each symbol interval, the transmitted optical intensity $P_t(t)$ can take on any one of the set of M distinct intensity levels:

$$P_{t,k}, k=0,\ldots,M-1,\qquad\text{(Eq. 3)}$$

where $M \geq 3$. The peak transmitted optical power is $P_{t,M-1}$ and the average transmitted optical power is:

$$P_{t,av} = \frac{1}{M}\sum_{k=0}^{M-1} P_{t,k},\qquad\text{(Eq. 4)}$$

assuming that the M intensity levels are transmitted with equal probabilities.

Although system performance is optimized if the lowest-intensity level $P_{t,0}$ is zero, nonidealities in the modulation subsystem 30 often require that $P_{t,0}$ be nonzero. It is well known that having nonzero $P_{t,0}$ can be particularly detrimental in the presence of signal-dependent noise. We define the extinction ratio of the transmitted multilevel optical signal to be the ratio between the highest- and lowest-intensity levels, a quantity that is greater than 1. We define an extinction ratio parameter δ that is the reciprocal of the extinction ratio:

$$\delta = \frac{P_{t,0}}{P_{t,M-1}}.\qquad\text{(Eq. 5)}$$

Note that δ<1. We often describe the extinction ratio on a decibel scale in terms of $-10 \log_{10} \delta$, a quantity that is greater than zero. In the ideal case of an infinite extinction ratio, we have δ=0 and $-10 \log_{10} \delta = \infty$. In the non-ideal case of a finite extinction ratio, we have δ>0 and $-10 \log_{10} \delta < \infty$.

The transmitted multilevel optical signal 31 can have an arbitrary phase $\phi_t(t)$, whether the phase $\phi_t(1)$ is imposed intentionally (e.g., through correlative line coding for spectral narrowing) or unintentionally (e.g., through chirp caused by direct modulation of a transmitter laser). We describe how to optimize the intensity levels of the transmitted multilevel optical signal 31 in the presence of various impairments. Our optimization of intensity levels is often independent of the phase $\phi_t(t)$. However, this optimization may depend on $\phi_t(t)$ when the optical transmission medium 34 has dispersion, which can cause ISI, altering the intensity levels of the received multilevel optical signal 35 in a way that depends on the phase $\phi_t(t)$.

The received multilevel optical signal 35 includes a signal component having electric field E(t) and intensity $P(t)=|E(t)|^2$. Setting aside any possible dispersion in the optical transmission medium 34, during each symbol interval the received signal component of 35 can take on one of a set of M distinct received intensity levels:

$$P_k, k=0,\ldots,M-1.\qquad\text{(Eq. 6)}$$

The set of M received intensity levels $P_k$, k=0, ..., M−1 is a scaled version of the set of M transmitted intensity levels $P_{t,k}$, k=0, ..., M−1, i.e., $P_{t,0}:P_{t,1}:\ldots:P_{t,M-1}=P_0:P_1:\ldots:P_{M-1}$. The peak received optical power is $P_{M-1}$ and the average received optical power is:

$$P_{av} = \left(\frac{1}{M}\right)\sum_{k=0}^{M-1} P_k,\qquad\text{(Eq. 7)}$$

assuming that the M intensity levels are transmitted with equal probabilities.

In this description, it is described how to adjust the transmitted intensity levels given by Eq. 3 to optimize performance, usually to minimize the average received power $P_{av}$ or the peak received power $P_{M-1}$ required to achieve a desired decision error probability. Since the set of received intensity levels in Eq. 6 is a scaled version of the set of transmitted intensity levels in Eq. 3, for notational convenience, in the remainder of this description, the invention will be described in terms of adjusting the received intensity levels given by Eq. 6 to optimize performance. In the remainder of this description, it should be understood that in practice, once an optimal set of received intensity levels has been determined, one should transmit a set of transmitted intensity levels that is an appropriately scaled version of the set of optimal received intensity levels.

The extinction ratio parameter δ, which has already been specified in Eq. 5 can also be specified in terms of the received intensity levels described in Eq. 6:

$$\delta = \frac{P_0}{P_{M-1}}.\qquad\text{(Eq. 8)}$$

When the optical transmission medium 34 has dispersion and introduces ISI to the received multilevel signal 35, then the levels taken on by the received multilevel optical signal 35 may sometimes differ from those given by Eq. 6, as explained below.

The optical preamplifier 37 has a gain G; if the receiver 36 omits an optical preamplifier, then the analysis given here is valid so long as we set G=1. At the output of the optical preamplifier 37, the preamplified optical signal 40 includes an ASE component described by the power spectral density $S_{sp}$. The optical bandpass filter has a noise bandwidth (for white noise) $\Delta v_{opt}$. The photodetector 43 has a responsivity R and a leakage current $I_d$. The received photocurrent 44 includes a multilevel signal component I(t)=RGP(t). Thus, I(t) is a PAM signal which, during each symbol interval, can take on any one of M distinct received photocurrent levels:

$$I_k=RGP_k, k=0,\ldots,M-1.\qquad\text{(Eq. 9)}$$

The received photocurrent 44 also includes several noise components, some signal-independent and others signal-dependent. Throughout this description, these noise components are characterized in terms of their variances referred to the input to the electrical preamplifier 45.

The preamplifier 45 has a noise bandwidth (for white noise) $\Delta f$. Within the bandwidth of the preamplifier 45, thermal noise (and other forms of electronic noise) within the preamplifier 45 have a variance $\sigma_{th}^2$.

When the received intensity level is $P_k$ and the received photocurrent level is $I_k=RGP_k$, then the total noise variance referred to the input of the preamplifier 45 is given by:

$$\sigma_k^2 = \sigma_{th}^2 + \sigma_{sh,k}^2 + \sigma_{sp-sp,k}^2 + \sigma_{sig-sp,k}^2 + \sigma_{sh-sp}^2, \quad \text{(Eq. 10)}$$

where $\sigma_{sh,k}^2$ is the shot noise of the signal, amplified spontaneous emission and photodetector leakage current, $\sigma_{sp-sp}^2$ is the spontaneous-spontaneous beat noise, $\sigma_{sig-sp,k}^2$ is the signal-spontaneous beat noise, and $Q_{sh-sp}^2$ is the shot-spontaneous beat noise. In Eq. 10, we have placed the subscript "k" only on those variances that are signal-dependent. In practice, the signal-spontaneous noise, $\sigma_{sig-sp,k}^2$, is usually the dominant noise source. The last four terms on the right-hand side of Eq. 10 are given by:

$$\sigma_{sh,k}^2 = 2q[R(GP_k + S_{sp}\Delta v_{opt}) + I_d]\Delta f \quad \text{(Eq. 11)}$$

$$\sigma_{sp-sp}^2 = 4R^2 S_{sp}^2 \Delta v_{opt} \Delta f \quad \text{(Eq. 12)}$$

$$\sigma_{sig-sp,k}^2 = 4R^2 GP_k S_{sp} \Delta f \quad \text{(Eq. 13)}$$

$$\sigma_{sh-sp}^2 = 4qRS_{sp}\Delta v_{opt}\Delta f \quad \text{(Eq. 14)}$$

where q is the electron charge. For the time being, we neglect relative-intensity noise and intersymbol interference.

In the receiver 36, the output from the electrical preamplifier 45 is the multilevel electrical signal 50 having a set of M distinct levels that is a scaled version of the set of received photocurrent levels given by Eq. 9. The multilevel decoder 51 makes decisions by comparing the signal 50 to a set of M−1 thresholds, thereby obtaining 52, the estimate of the information bit stream. To simplify notation, in this description, we will consider decisions made by comparing the received photocurrent 44 to a set of M−1 thresholds that are a scaled version of the set of thresholds used by the multilevel decoder 51. This is equivalent to considering the preamplifier 45 having unit gain and saying that the decisions are made by the multilevel decoder 51. The optimized intensity levels we obtain are identical to those that would be obtained by considering decisions made by the decoder 51 based on the signal 50.

Let I be a value of the received photocurrent 44. In order to make a decision, a value of I is compared to a set of M−1 decision thresholds:

$$I_{th,k}, k=1,\ldots,M-1, \quad \text{(Eq. 15)}$$

where decision threshold $I_{th,k}$ lies between $I_{k-1}$ and $I_k$. Let $I_{\hat{k}}$ denote the photocurrent level chosen by the decision (corresponding to a choice of transmitted intensity level $P_{t,\hat{k}}$ and received intensity level $P_{\hat{k}}$). Decisions are characterized by the decision error probabilities:

$$p_{l+} = Pr\left\{\left\{\bigcup_{m=l+1}^{M-1} I_{\hat{k}} = I_m\right\} | I_k = I_l\right\}, l = 0, \ldots, M-2 \quad \text{(Eq. 16)}$$

$$p_{l-} = Pr\left\{\left\{\bigcup_{m=0}^{l-1} I_{\hat{k}} = I_m\right\} | I_k = I_l\right\}, l = 1, \ldots, M-1,$$

where $p_{l+}=0$ for l=M−1 and $p_{l-}=0$ for l=0. Note that $p_{l+}$ is the probability that when photocurrent level $I_l$ is received, the decision favors levels above $I_l$, i.e., the decision is one of $I_{l+1}, \ldots, I_{M-1}$. Likewise, $p_{l-}$ is the probability that when photocurrent level $I_l$ is received, the decision favors levels below $I_l$, i.e., the decision is one of $I_0, \ldots, I_{l-1}$.

It is common practice to define a set of M−1 "Q factors". The kth "Q factor" is given by:

$$Q_k = \frac{I_k - I_{k-1}}{\sigma_k + \sigma_{k-1}}, k = 1, \ldots, M-1. \quad \text{(Eq. 17)}$$

For noises commonly encountered in optical communication systems, e.g., the noises described in Eq. 10, the decision error probabilities given by Eq. 16 depend strongly on the Q factors given by Eq. 17. In the present invention, we describe Algorithms 1–5, denoted as 32a–e, respectively, for optimizing the transmitted intensity levels to minimize the received power required to achieve a specified set of Q factors at the M−1 decision thresholds. For noises commonly encountered in optical communication systems, these Algorithms 32a–e tend to minimize the received power required to achieve a specified set of decision error probabilities at the M−1 decision thresholds.

For noises commonly encountered in optical communication systems, it is well known that a good choice for the set of thresholds in Eq. 15 is given by:

$$I_{th,k} = \frac{\sigma_k I_{k-1} + \sigma_{k-1} I_k}{\sigma_{k-1} + \sigma_k}, k = 1, \ldots, M-1. \quad \text{(Eq. 18)}$$

If the noise is signal-independent, $\sigma_{k-1}=\sigma_k$, then the threshold given by Eq. 18 is $I_{th,k}=(I_{k-1}+I_k)/2$, i.e., it lies at the arithmetic mean of $I_{k-1}$ and $I_k$. In most cases of signal-dependent noise, $\sigma_{k-1}<\sigma_k$, so that the threshold given by Eq. 18 is $i_{th,k}<(I_{k-1}+I_k)/2$. In the special case that $\sigma_k^2 \propto I_k$, the threshold given by Eq. 18 lies at $I_{th,k}=\sqrt{I_{k-1}I_k}$, which is the geometric mean of $I_{k-1}$ and $I_k$.

Noises commonly encountered in optical communication systems are often modeled as being Gaussian-distributed. For Gaussian-distributed noises, conditioned upon reception of received photocurrent level $I_k$ (corresponding to transmitted intensity level $P_{t,k}$ and received intensity level $P_k$), the probability density of I is given by:

$$p(I|I_k) = \frac{1}{\sqrt{2\pi\sigma_k^2}}\exp\left[-\frac{(I-I_k)^2}{2\sigma_k^2}\right]. \quad \text{(Eq. 19)}$$

In the case of Gaussian-distributed noise, if the decision thresholds are chosen following Eq. 18, the decision error probability at the kth decision threshold is given by:

$$p_{k-1,+} = p_{k,-} = \frac{1}{2}erfc\left(\frac{Q_k}{\sqrt{2}}\right), \quad \text{(Eq. 20)}$$

where the Q factors are defined in Eq. 17. For example, Q factors of 2 and 7 correspond to decision error probabilities of about 0.02 and $10^{-12}$, respectively. We emphasize, however, that the present invention does not necessarily make use of the assumption that the noises in the system 20 are Gaussian-distributed.

Figure 2A:
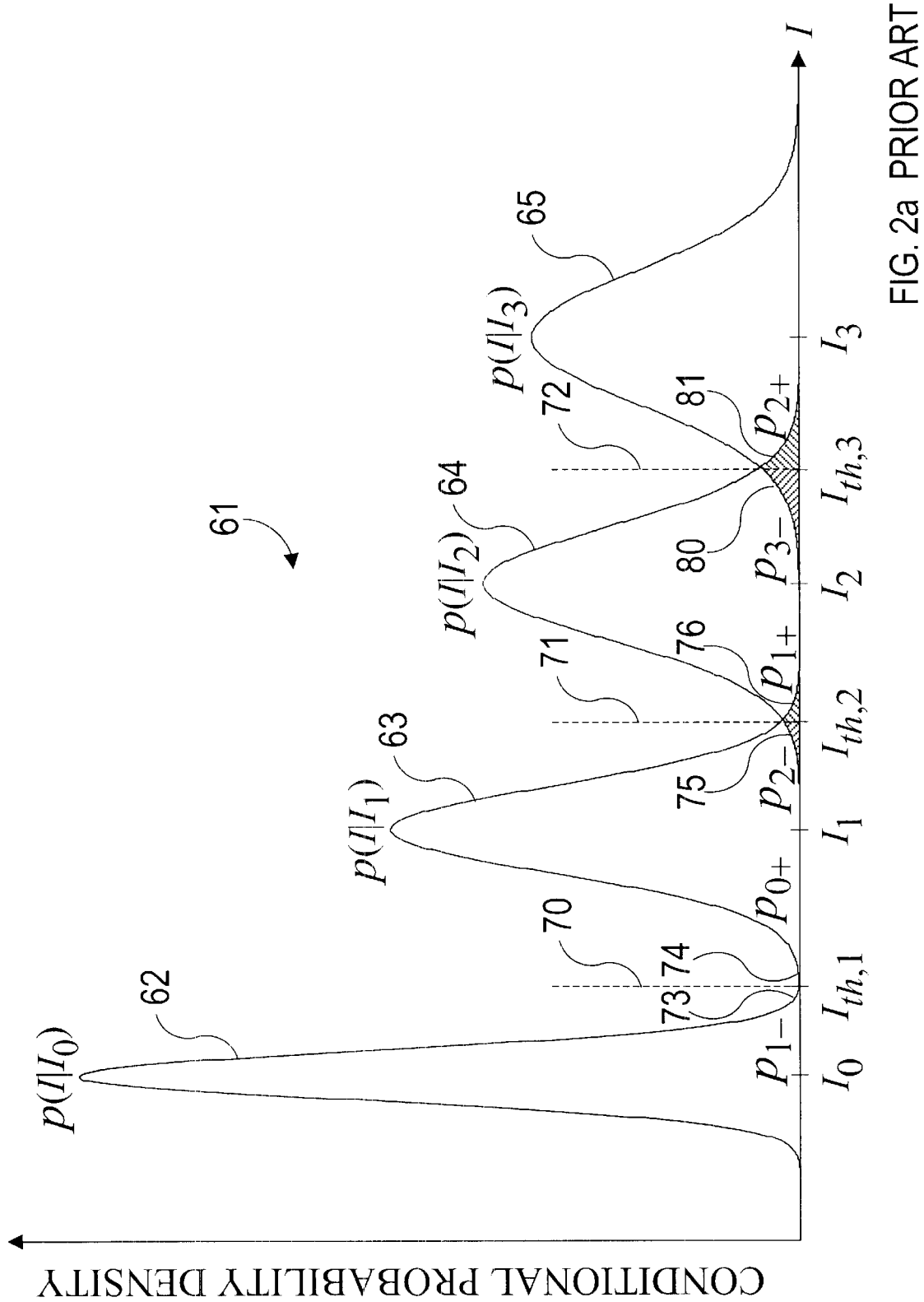
FIG. 2a is a probability density of the prior art for a received photocurrent conditioned upon transmission of each of four equally spaced intensity levels for a particular representative set of system parameters.
Figure 2B:
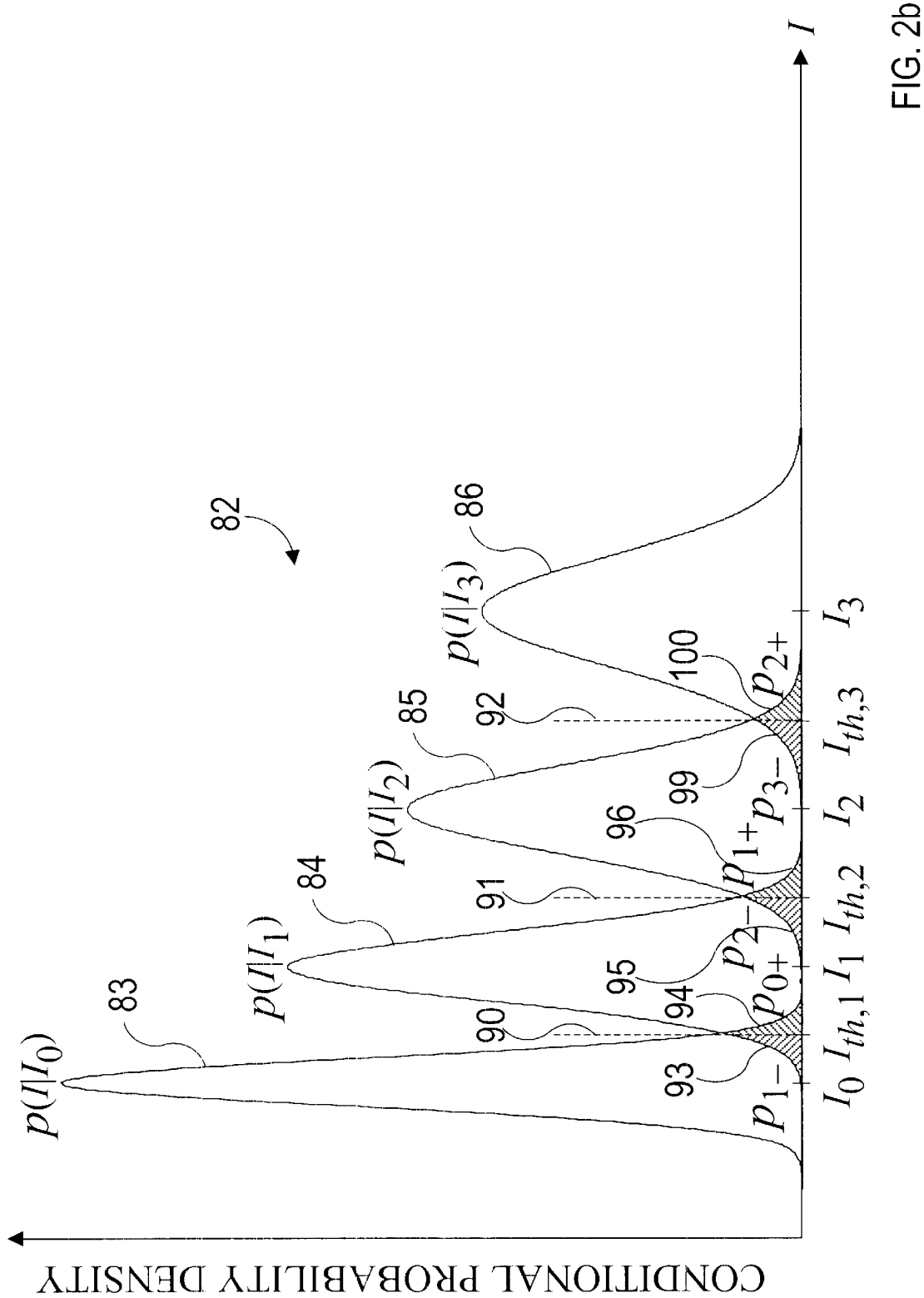
FIG. 2b is a probability density for a received photocurrent conditioned upon transmission of each of four intensity levels whose spacing is optimized under the present invention for the particular representative set of system parameters.

FIGS. 2a and 2b present probability density curves 61 and 82, respectively, of the received photocurrent I conditioned upon reception of each of four received photocurrent levels $I_0$, $I_1$, $I_2$, and $I_3$ in exemplary 4-ary PAM systems. In the probability density curves 61 and 82, we consider a following representative set of parameters: the number of transmitted intensity levels is M=4; the bit rate of the information bit stream 22 is 40 Gbps; the symbol rate of the transmitted multilevel optical signal 31 is 1/T=20 Gbaud; the transmitter extinction ratio parameter of the system 20 is δ=0.032 (corresponding to a 15 dB extinction ratio); the ASE power spectral density of the preamplified optical signal 40 is $S_{sp}=10^{-17}$ W/Hz; the gain of the optical preamplifier 37 is G=100 (corresponding to 20 dB); the bandwidth of the optical filter 41 is $\Delta v_{opt}$, 36 GHz; the responsivity and leakage current of the photodetector 43 are R=0.8 A/W and $I_d$=1 nA, respectively; and the noise bandwidth and input-referred noise variance of the electrical preamplifier 45 are $\Delta f$=22 GHz and $\sigma_{th}^2$=8.8×10$^{-12}$ A$^2$, respectively.

FIG. 2a illustrates the use of equally spaced transmitted intensity levels in the prior art chosen so that $Q_3$=2. The probability density curve 61 of FIG. 2a includes probability density curves 62, 63, 64, and 65 for the received photocurrent I conditioned upon reception of four photocurrent levels $I_0$, $I_1$, $I_2$, and $I_3$, respectively, denoted by the symbols p(I|$I_0$), p(I|$I_1$), p((I|$I_2$), p(I|$I_3$), respectively. Decision thresholds $I_{th,1}$, $I_{th,2}$, $I_{th,3}$, chosen according to Eq. 18, are numbered 70, 71, 72, respectively. Shaded regions representing the decision error probabilities $p_{1-}$, $p_{0+}$, $p_{2-}$, $p_{1+}$, $p_{3-}$, $p_{2+}$ are numbered 73, 74, 75, 76, 80, 81, respectively (the regions 73 and 74 are so small as to be invisible). The decision error probabilities at the three thresholds 70, 71, 72 are highly unequal (for example, if we model all of the noises described in Eq. 10 as Gaussian-distributed, using Eq. 20 and Eq. 17, we find that: $p_{1-=p0+}$=1.6×10$^{-4}$, $p_{2-}=p_{1+}$=6.6×10$^{-3}$, $p_{3-}=p_{2+}$=2.2×10$^{-2}$.) Almost all of the errors in occur at the highest threshold level $I_{th,3}$ (72). The overall decision error probability of the system is of the same order of magnitude as the error probability at the threshold $I_{th,3}$ (72), despite the much lower values of error probabilities at the lower thresholds $I_{th,1}$ (70) and $I_{th,2}$ (71). In this system, the use of equally spaced levels does not make efficient use of available transmitted optical power. The photocurrent I that is compared to the thresholds 70–72, described above, is shown in FIG. 1 as the photocurrent 44. In another such system, the electrical signal 50 may be compared to a set of thresholds analogous to the thresholds 70–72.

FIG. 2b illustrates the use of unequally spaced transmitted intensity levels chosen to optimize power efficiency with an Algorithm 1 (32a), described shortly, of the present invention, so that Q factors at all three decision thresholds are equal, i.e., $Q_1$=$Q_2$=$Q_3$=2 or substantially equal, since in practice components that implement the invention will result in deviations, and the present invention can also be implemented without the decision thresholds being equal, as described further herein. The probability density curve 82 of FIG. 2b includes probability curves 83, 84, 85, and 86 of the received photocurrent I conditioned upon reception of four photocurrent levels $I_0$, $I_1$, $I_2$, and $I_3$, respectively, denoted by the symbols p(I|$I_0$), p(I|$I_1$), p(I|$I_2$), p(I|$I_3$), respectively. Decision thresholds $I_{th,1}$, $I_{th,2}$, $I_{th,3}$, chosen according to Eq. 18, are numbered 90, 91, 92, respectively. Shaded regions representing the decision error probabilities $p_{1-}$, $p_{0+}$, $p_{2-}$, $p_{1+}$, $p_{3-}$, $p_{2+}$ are numbered 93, 94, 95, 96, 99, 100, respectively. All of the decision error probabilities 93, 94, 95, 96, 99, 100 are substantially equal (for example, if we model all of the noises in Eq. 10 as Gaussian-distributed, then using Eq. 20 and Eq. 17, we find that the decision error probabilities at the three thresholds 90, 91, 92 are equal: $p_{1-}=p_{0+}=p_{2-}=p_{1+}=p_{3-}=p_{2+}$=2.2×10$^{-2}$). Thus, none of the three thresholds 90, 91, 92 dominates the error probability of the system, and the overall decision error probability is approximately equal to any of the decision error probabilities 93, 94, 95, 96, 99, 100. FIG. 2b (82) illustrates how the use of unequally spaced transmitted intensity levels can make optimal use of available optical power. The photocurrent I that is compared to the thresholds 90–92, described above, is shown in FIG. 1 as the photocurrent 44. In another preferred embodiment, the electrical signal 50 may be compared to a set of thresholds analogous to the thresholds 90–92.

Figure 3A:
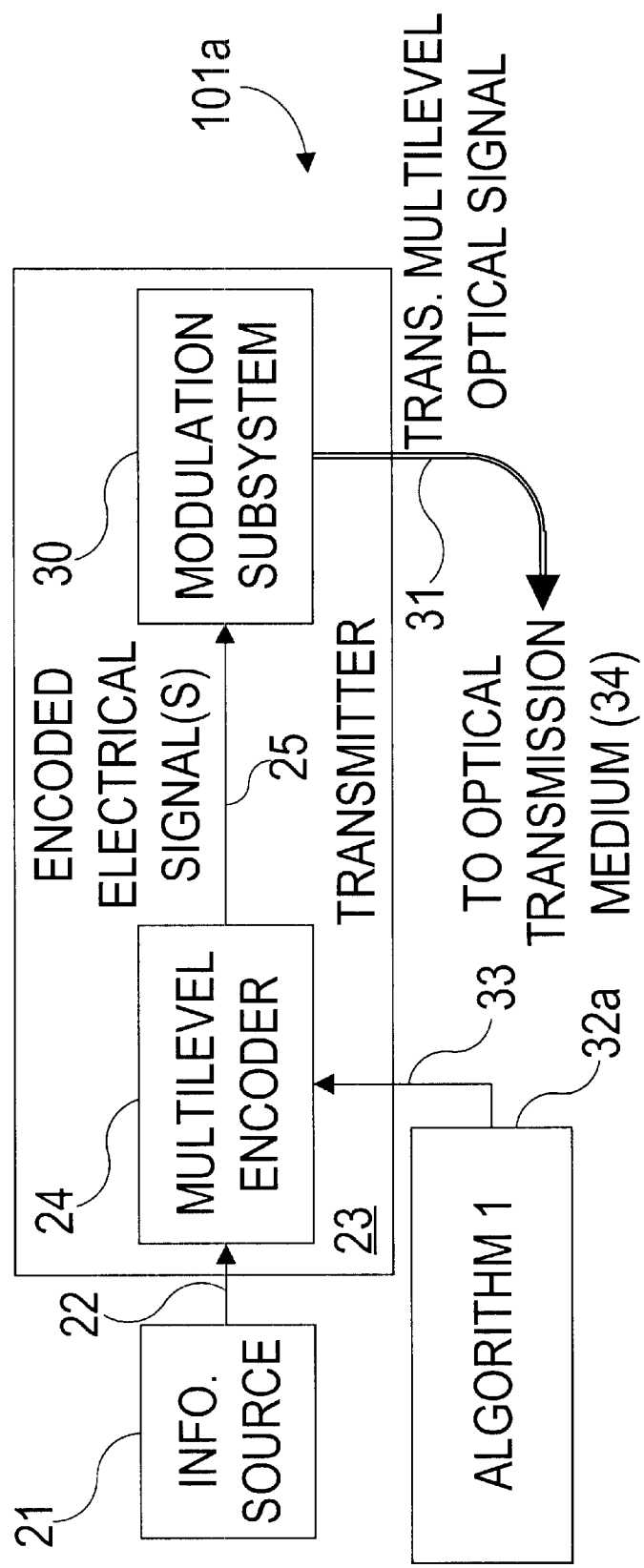
FIG. 3a is a portion of the optical communication system shown in FIG. 1, including a transmitter transmitting multilevel signals and a level-setting Algorithm 1 for optimizing the multilevel signals under the present invention.

We now describe an analytical optimization of the transmitted intensity levels in the system 20 considering the following impairments: signal-independent noise, signal-dependent noise having a variance proportional to the received intensity, and a finite transmitter extinction ratio. This optimization yields equal Q factors at all M−1 decision thresholds. We refer to this optimization as Algorithm 1 (32a). FIG. 3a, given the general reference number 101a, illustrates a portion of the optical communication system 20, showing that Algorithm 1 (32a) passes level-setting information 33 to the multilevel encoder 24 within the transmitter 23.

Considering the noises described in Eq. 10–Eq. 14, the overall noise variance given by Eq. 10 can be separated into two parts: signal-independent and signal-dependent, i.e., $$\sigma_k^2 = \sigma_{ind}^2 + \gamma P_k \quad \text{(Eq. 21)}$$

where $\sigma_{ind}^2$ includes all of $\sigma_{th}^2$, $\sigma_{sp-sp}^2$, $\sigma_{sh-sp}^2$ and the second and third terms of $\sigma_{sh,k}^2$. The term $\gamma P_k$ includes $\sigma_{sig-sp,k}^2$ and the first term of $\sigma_{sh,k}^2$. The parameter governing signal-dependent noise, $\gamma$, is given by:

$$\gamma = 2qRG\Delta f + 4R^2 G_{sp} \Delta f. \quad \text{(Eq. 22)}$$

Using Eq. 17, the Q factor for the kth decision threshold is:

$$Q_k = \frac{RG(P_k - P_{k-1})}{\sqrt{\sigma_{ind}^2 + \gamma P_k} + \sqrt{\sigma_{ind}^2 + \gamma P_{k-1}}}, \quad \text{(Eq. 23)}$$

which can be further simplified to:

$$Q_k = \frac{RG}{\gamma}\left(\sqrt{\sigma_{ind}^2 + \gamma P_k} - \sqrt{\sigma_{ind}^2 + \gamma P_{k-1}}\right). \quad \text{(Eq. 24)}$$

If we define:

$$\rho_{ind} = \frac{\sigma_{ind}^2}{\gamma} \text{ and} \quad \text{(Eq. 25)}$$

$$C_k = \frac{Q_k \sqrt{\gamma}}{RG}, \quad \text{(Eq. 26)}$$

then we can rewrite Eq. 24 in the simple form:

$$C_k = \sqrt{\rho_{ind}+P_k} - \sqrt{\rho_{ind}+P_{k-1}}. \quad \text{(Eq. 27)}$$

Requiring $Q_k$=Q (equivalent to $C_k$=C) for all k=1, . . . , M−1, we get:

$$P_k = (kC + \sqrt{\rho_{ind}+P_0})^2 - \rho_{ind}, \ k=1, \ldots, M-1, \quad \text{(Eq. 28)}$$

in terms of the lowest received intensity level $P_0$. Recalling the definition of the extinction ratio parameter given by Eq. 8, we need to find the highest received intensity level $P_{M-1}$ by using $$P_{M-1} = \frac{P_0}{\delta} = \left[(M-1)C + \sqrt{\rho_{ind}+P_0}\right]^2 - \rho_{ind}. \quad \text{(Eq. 29)}$$

The solution is:

$$P_{M-1} = \frac{(M-1)C[(1+\delta)(M-1)C + 2(\rho_{ind}(1-\delta)^2 + \delta(M-1)^2 C^2)^{\frac{1}{2}}]}{(1-\delta)^2} \quad \text{(Eq. 30)}$$

and $$P_k = (kC + \sqrt{\rho_{ind}+\delta \cdot P_{M-1}})^2 - \rho_{ind}, \ k=0 \ldots, M-2. \quad \text{(Eq. 31)}$$

The combination of Eq. 30 and Eq. 31 is the Algorithm 1 (32a).

It is instructive to examine the results of Eq. 30 and Eq. 31 in several limiting cases. We see that $P_k \approx k^2 C^2$ for large k. This approximation is valid for $k >> \sqrt{P_{ind} + \delta \cdot P_{M-1}}/C$, i.e., at a value of k that depends on the relative magnitudes of C and $\sqrt{P_{ind} + \delta P_{M-1}}$. If the system 20 has an infinite transmitter extinction ratio ($\delta = 0$), Eq. 31 becomes $$P_k = (kC + \sqrt{\rho_{ind}})^2 - \rho_{ind}, \; k = 0, \ldots, M-1. \quad \text{(Eq. 32)}$$

If the system 20 has very small signal-independent noise, i.e., $\rho_{ind} << P_k$ for $k = 0, \ldots, M < 1$, we get $$P_k = \left(\sqrt{\delta} + k\frac{1-\sqrt{\delta}}{M-1}\right)^2 P_{M-1}, \quad \text{(Eq. 33)}$$

and the optimal intensity level spacing becomes independent of C, i.e., independent of the required Q factor value $Q_k = Q$ for $k = 1, \ldots, M-1$. Under both the conditions $\rho_{ind} << P_k$ and $\delta = 0$, the solution is simply $$P_k = \left(\frac{k}{M-1}\right)^2 P_{M-1}, \quad \text{(Eq. 34)}$$

i.e., the optimal intensity levels form a quadratic series, as pointed out by Walkin and Conradi.

Table 1 presents some representative results obtained using Algorithm 1 (32a) in a system 20 using 4-ary PAM. All of the parameters assumed in Table 1 are the same as those considered in FIGS. 2a–b except as follows. In Table 1, the transmitted intensity levels are optimized to achieve $Q_1 = Q_2 = Q_{b\,3} = 7$. In Table 1, three values of the extinction ratio parameter are considered: $\delta = 0$, $\delta = 0.01$ and $\delta = 0.03$. Also, Table 1 considers the case when the signal-independent term in Eq. 21 is included ($\rho_{ind} \neq 0$), as well as the case when the signal-independent term is set to zero ($\rho_{ind} = 0$). The power reductions indicated represent the reduction of average received power $P_{av}$ and of peak received power $P_3$ achieved by a set of optimal intensity levels as compared to a set of equally spaced intensity levels that yield $Q_3 = 7$ (and yield $Q_1 > 7$, $Q_2 > 7$). The optimal received intensity levels determined using Algorithm 1 (32a) are indicated via the ratios $P_0/P_3$, $P_1/P_3$, and $P_2/P_3$ which are, respectively, equal to the optimal ratios of transmitted intensity levels $P_{t,0}/P_{t,3}$, $P_{t,1}/P_{t,3}$, and $P_{t,2}/P_{t,3}$. The receiver thresholds determined using Eq. 18 are indicated via the ratios $I_{th,1}/I_3$, $I_{th,2}/I_3$, $I_{th,3}/I_3$. Note that in each case, the reduction of average received power $P_{av}$ exceeds the reduction of the peak received power $P_3$. The reductions of average and peak powers are greater when $\rho_{ind}$ is zero and when $\delta$ is small. As an example representative of a practical system implementation, when $\rho_{ind}$ is nonzero and $\delta = 0.01$, the reductions of average and peak received powers are 4.32 dB and 3.63 dB, respectively.

Figure 3B:
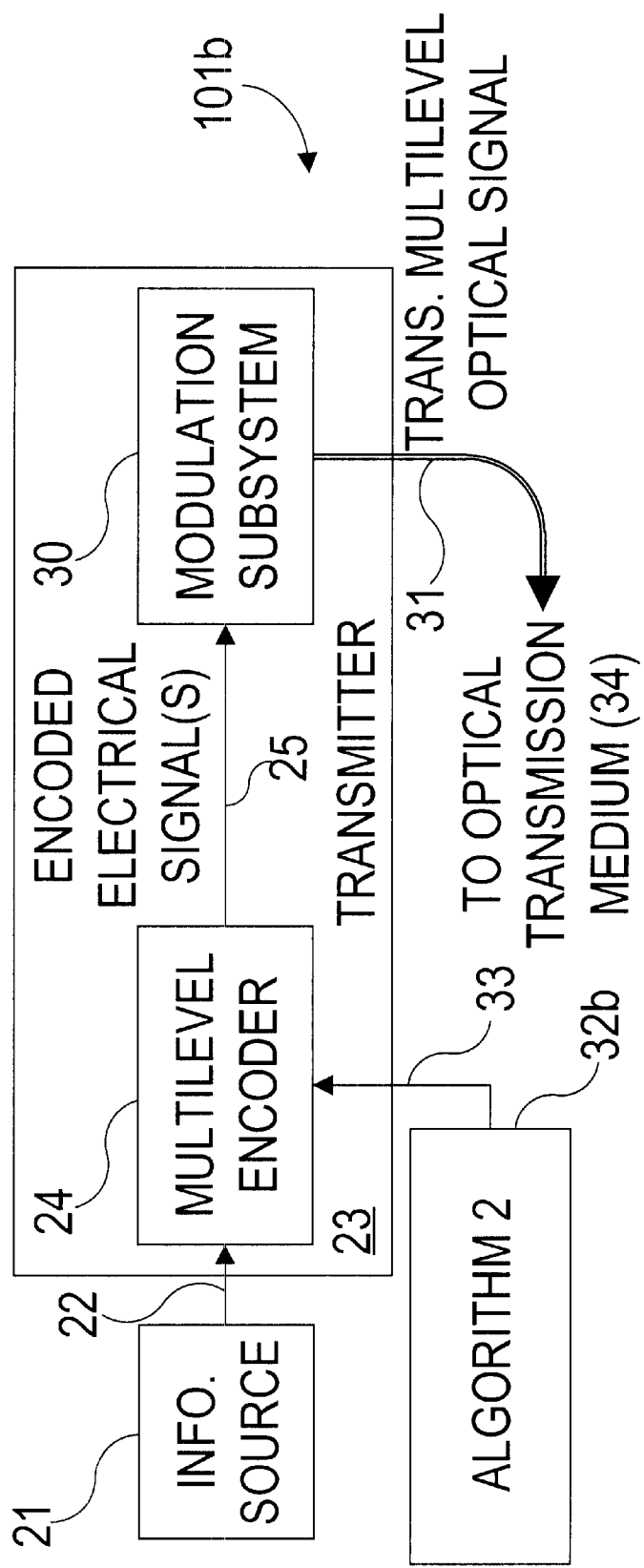
FIG. 3b is a portion of the optical communication system shown in FIG. 1, including a transmitter transmitting multilevel signals and a level-setting Algorithm 2 for optimizing the multilevel signals under the present invention.
Figure 3C:
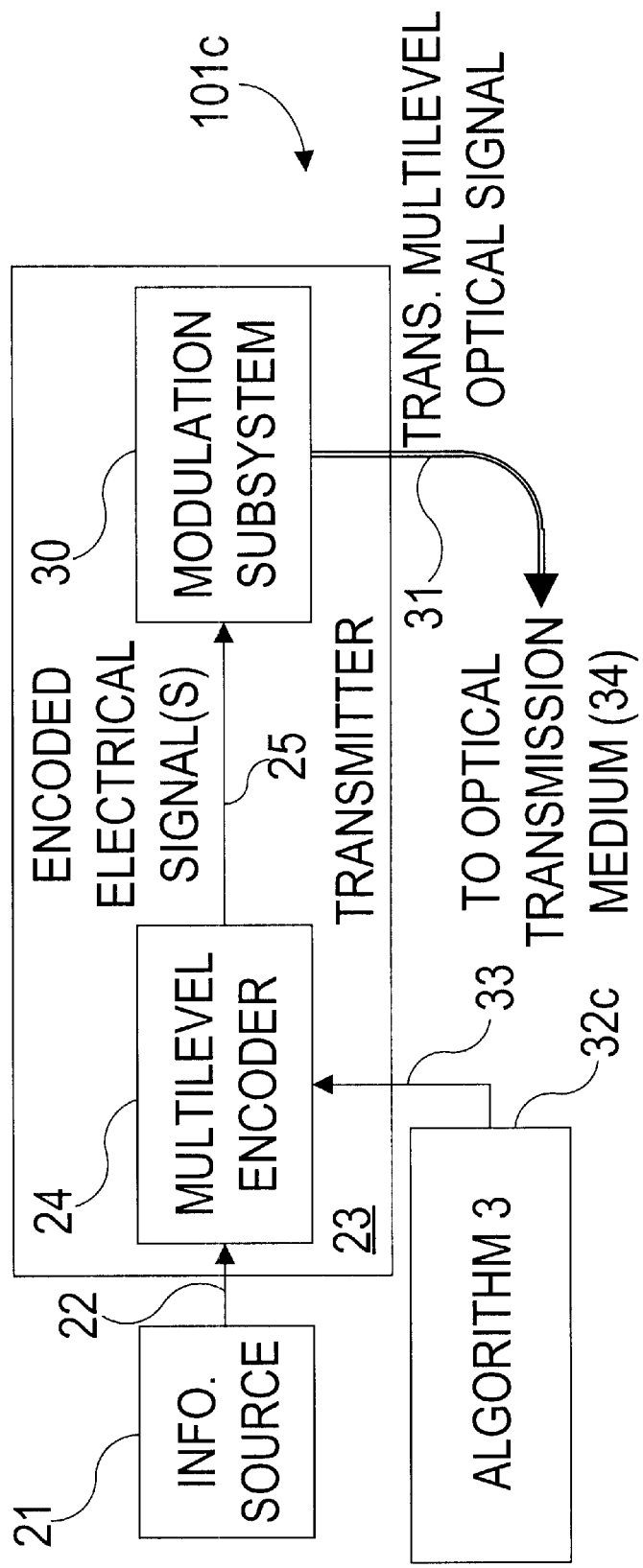
FIG. 3c is a portion of the optical communication system shown in FIG. 1, including a transmitter transmitting multilevel signals and a level-setting Algorithm 3 for optimizing the multilevel signals under the present invention.
Figure 3D:
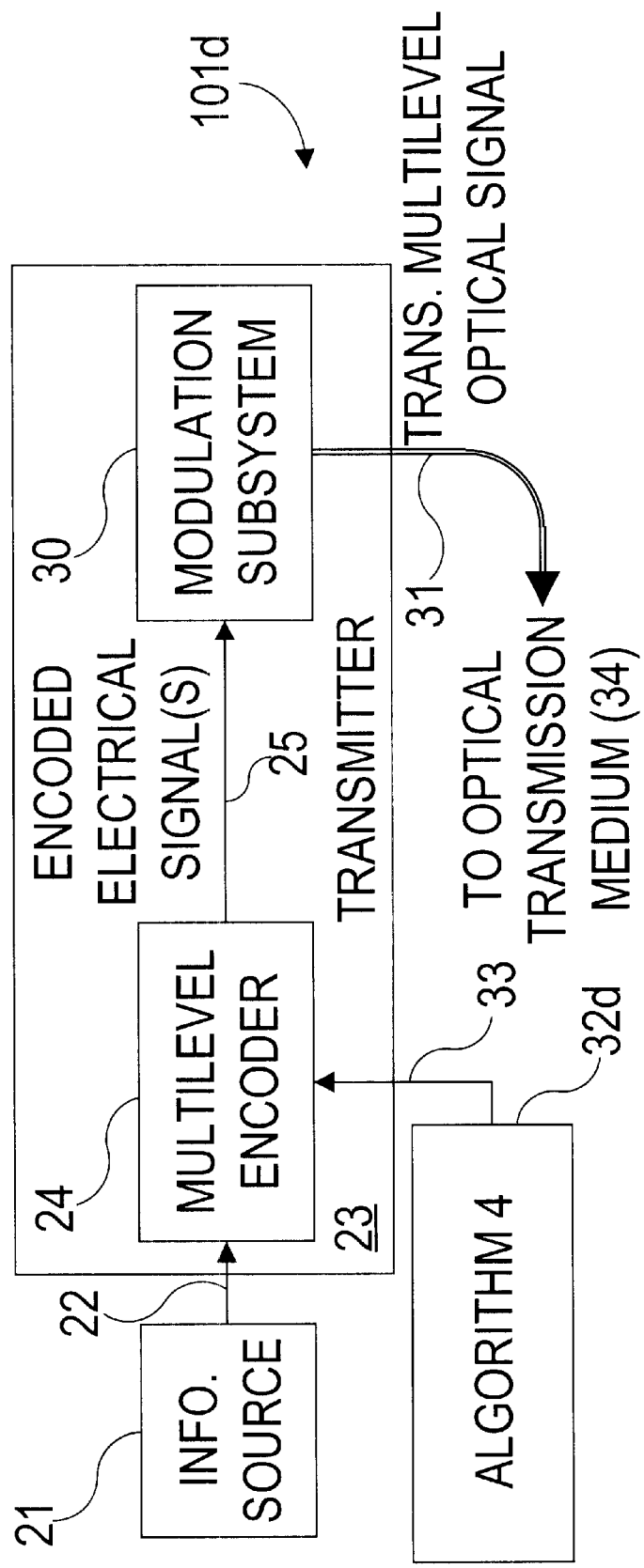
FIG. 3d is a portion of the optical communication system shown in FIG. 1, including a transmitter transmitting multilevel signals and a level-setting Algorithm 4 for optimizing the multilevel signals under the present invention.
Figure 4C:
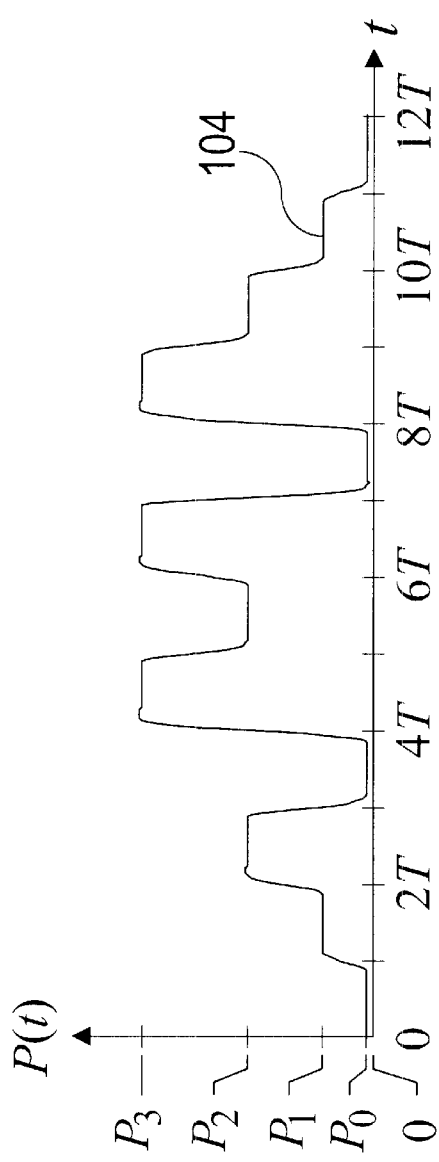
Figure 4D:
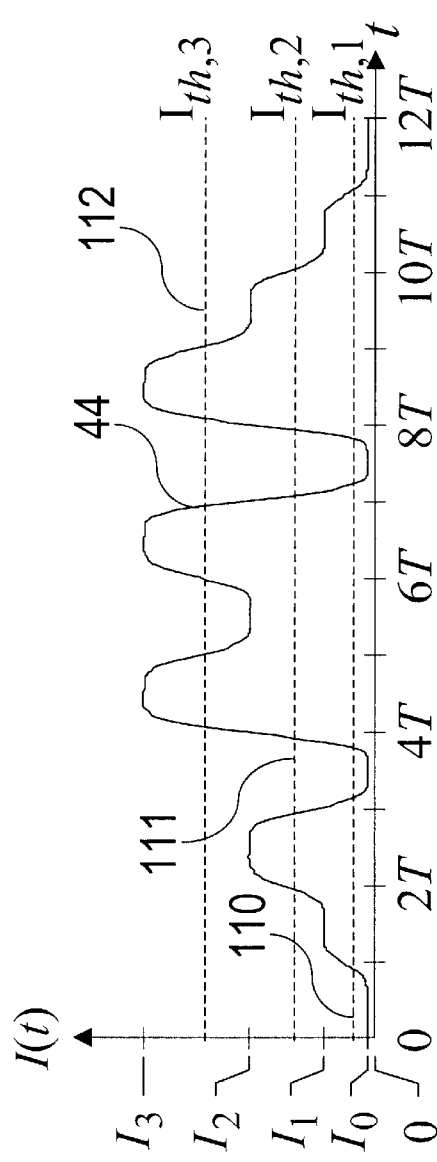

FIGS. 3a–d present waveforms of four-level optical and electrical signals having levels optimized using Algorithm 1 (32a) for a representative set of system parameters identical to those considered in FIGS. 2a–b except that in FIGS. 3a–d, the transmitted intensity levels are optimized to achieve $Q_1 = Q_2 = Q_3 = 7$. The parameters assumed in FIGS. 2a–b correspond to the third row of TABLE 1. FIG. 4a shows a waveform of $|E_t(t)|$, a magnitude 102 of the transmitted multilevel optical signal 31. FIG. 4b shows a waveform of $P_t(t)$ 103 for the transmitted multilevel optical signal 31. FIG. 4c shows a waveform of P(t) 104 for the received multilevel optical signal 35. FIG. 4d shows a waveform of I(t), the received photocurrent 44, and indicates decision thresholds $I_{th,1}$, $I_{th,2}$, $I_{th,3}$ denoted by 110, 111 and 112, respectively. The decision thresholds 110, 111 and 112 have been set (relative to the highest received photocurrent level $I_3$) following the values of the ratios $I_{th,1}/I_3$, $I_{th,2}/I_3$ and $I_{th,3}/I_3$ in the third row of TABLE 1, which have been determined using Eq. 18.

Figure 5:
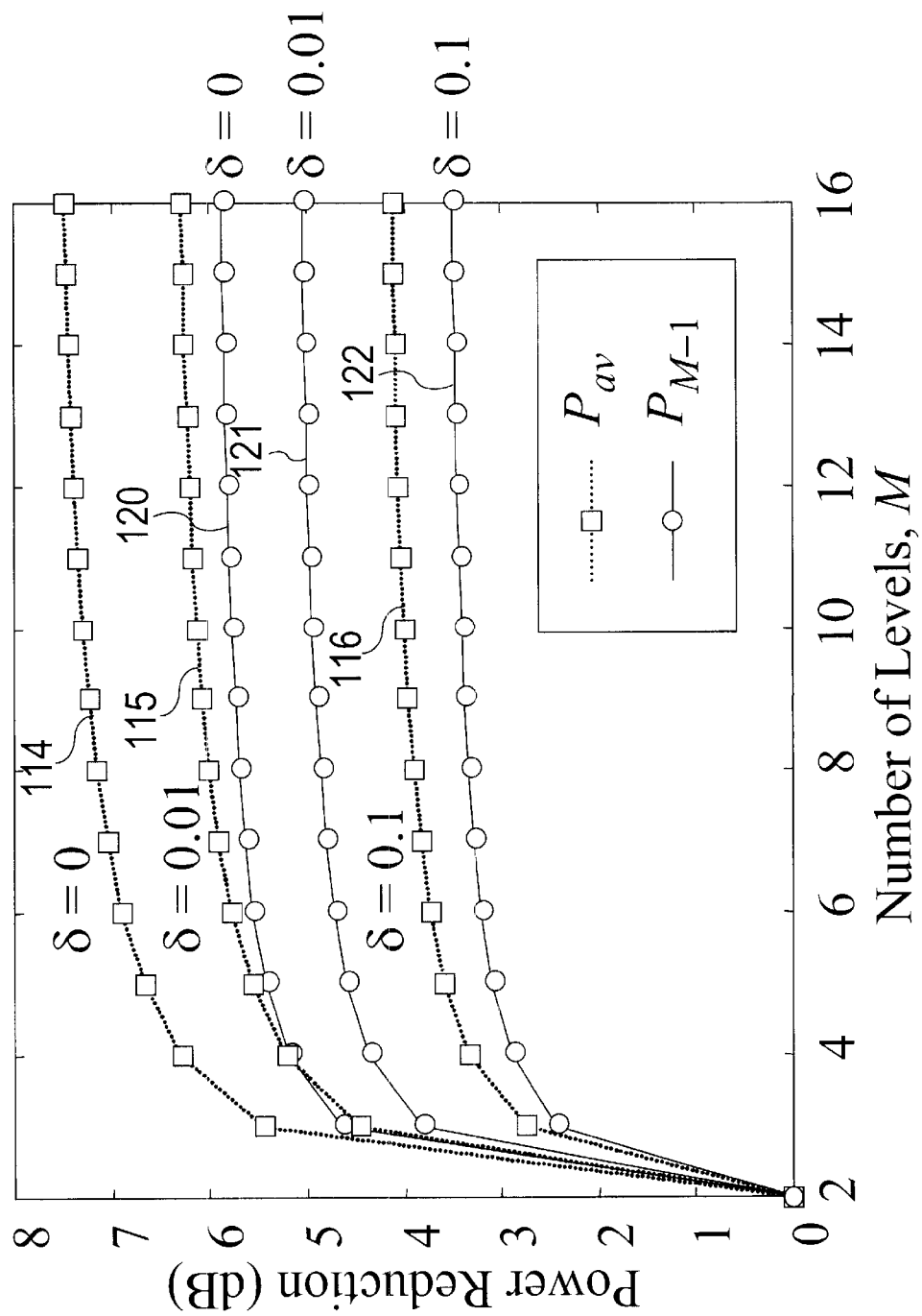
FIG. 5 presents a reduction of average optical power and of peak optical power achieved by using intensity levels optimized under the present invention, as a function of a number of intensity levels, for various values of a transmitter extinction ratio, assuming noise is dominated by a signal-dependent component whose variance is proportional to received optical intensity.

FIG. 5 shows the power reduction achieved using transmitted intensity levels designed by Algorithm 1 (32a) as compared to equally spaced transmitted intensity levels as a function of M, the number of levels, in the limit of small signal-independent noise, i.e., $\rho_{ind} << P_k$ for $k = 0, \ldots, M-1$. Given a required value of Q, the levels designed using Algorithm 1 (32a) achieve $Q_k = Q$ for $k = 1, \ldots, M-1$, while the equally spaced levels achieve $Q_{M-1} = Q$ and $Q_k > Q$ for $k = 1, \ldots, M-2$. Note that when the signal-independent noise is small, the power reductions are independent of the required value of Q. Reductions in average power $P_{av}$ for $\delta = 0$, 0.01 and 0.1, respectively, are indicated by parametric curves 114, 115 and 116, respectively, while reductions in peak power $P_{M-1}$ for $\delta = 0$, 0.01 and 0.1, respectively, are indicated by parametric curves 120, 121 and 122, respectively. For $M \geq 3$, in each case, the reduction in average power $P_{av}$ always exceeds the corresponding reduction in peak power $P_{M-1}$. In each case, the power reductions are larger for smaller values of $\delta$ (larger transmitter extinction ratio). When the transmitter extinction ratio is infinite ($\delta = 0$), in the limit of large M, the reductions of average power $P_{av}$ and peak power $P_{M-1}$ reach asymptotic values of 7.78 dB (a factor of 6) and 6.02 dB (a factor of 4), respectively.

TABLE 1

| Signal-Independent Noise | Extinction Ratio | Power Reduction (dB) | | Optimal Intensity Levels | | | Threshold Levels | | |
|---|---|---|---|---|---|---|---|---|---|
| | | $P_{av}$ | $P_3$ | $P_0/P_3$ | $P_1/P_3$ | $P_2/P_3$ | $I_{th,1}/I_3$ | $I_{th,2}/I_3$ | $I_{th,3}/I_3$ |
| $\rho_{ind} \neq 0$ | ∞ dB ($\delta = 0$) | 4.53 | 3.78 | 0.000 | 0.175 | 0.508 | 0.048 | 0.302 | 0.715 |
| | 20 dB ($\delta = 0.01$) | 4.32 | 3.63 | 0.010 | 0.190 | 0.520 | 0.063 | 0.318 | 0.723 |
| | 15 dB ($\delta = 0.03$) | 3.95 | 3.35 | 0.032 | 0.221 | 0.544 | 0.093 | 0.349 | 0.738 |
| $\rho_{ind} = 0$ | ∞ dB ($\delta = 0$) | 6.28 | 5.18 | 0.000 | 0.111 | 0.444 | 0.000 | 0.222 | 0.667 |
| | 20 dB ($\delta = 0.01$) | 5.22 | 4.37 | 0.010 | 0.160 | 0.490 | 0.040 | 0.280 | 0.700 |
| | 15 dB ($\delta = 0.03$) | 4.48 | 3.79 | 0.032 | 0.204 | 0.527 | 0.080 | 0.328 | 0.726 |

TABLE 2

| Extinction Ratio | Desired Q Factor | $\sigma_{th}^2$ ($10^{-12}$ $A^2$) | Optimal Intensity Levels | |
|---|---|---|---|---|
| | | | $P_0/P_2$ | $P_1/P_2$ |
| 6 dB ($\delta = 0.251$) | 2.8 | 10.1 | 0.251 | 0.564 |
| | | 40.5 | | 0.564 |
| | 7.0 | 10.1 | | 0.564 |

TABLE 2-continued

| Extinction Ratio | Desired Q Factor | $\sigma_{th}^2$ ($10^{-12}$ A$^2$) | Optimal Intensity Levels | |
|---|---|---|---|---|
| | | | $P_0/P_2$ | $P_1/P_2$ |
| | | 40.5 | | 0.564 |
| 9 dB | 2.8 | 10.1 | 0.126 | 0.461 |
| ($\delta$ = 0.126) | | 40.5 | | 0.461 |
| | 7.0 | 10.1 | | 0.459 |
| | | 40.5 | | 0.459 |
| 12 dB | 2.8 | 10.1 | 0.063 | 0.395 |
| ($\delta$ = 0.063) | | 40.5 | | 0.396 |
| | 7.0 | 10.1 | | 0.392 |
| | | 40.5 | | 0.392 |
| 15 dB | 2.8 | 10.1 | 0.032 | 0.355 |
| ($\delta$ = 0.032) | | 40.5 | | 0.356 |
| | 7.0 | 10.1 | | 0.348 |
| | | 40.5 | | 0.349 |
| 18 dB | 2.8 | 10.1 | 0.016 | 0.330 |
| ($\delta$ = 0.016) | | 40.5 | | 0.332 |
| | 7.0 | 10.1 | | 0.319 |
| | | 40.5 | | 0.320 |
| 21 dB | 2.8 | 10.1 | 0.008 | 0.315 |
| ($\delta$ = 0.008) | | 40.5 | | 0.317 |
| | 7.0 | 10.1 | | 0.301 |
| | | 40.5 | | 0.301 |
| ∞ dB | 2.8 | 8.8 | 0.000 | 0.298 |
| ($\delta$ = 0.000) | | 35.2 | | 0.301 |
| | 7.0 | 8.8 | | 0.272 |
| | | 35.2 | | 0.273 |

TABLE 3

| Extinction Ratio | Desired Q Factor | $\sigma_{th}^2$ ($10^{-12}$ A$^2$) | Optimal Intensity Levels | | |
|---|---|---|---|---|---|
| | | | $P_0/P_3$ | $P_1/P_3$ | $P_2/P_3$ |
| 6 dB | 2.8 | 8.8 | 0.251 | 0.446 | 0.695 |
| ($\delta$ = 0.251) | | 35.2 | | 0.446 | 0.695 |
| | 7.0 | 8.8 | | 0.446 | 0.695 |
| | | 35.2 | | 0.446 | 0.695 |
| 9 dB | 2.8 | 8.8 | 0.126 | 0.325 | 0.617 |
| ($\delta$ = 0.126) | | 35.2 | | 0.323 | 0.617 |
| | 7.0 | 8.8 | | 0.325 | 0.616 |
| | | 35.2 | | 0.325 | 0.616 |
| 12 dB | 2.8 | 8.8 | 0.063 | 0.253 | 0.565 |
| ($\delta$ = 0.063) | | 35.2 | | 0.253 | 0.565 |
| | 7.0 | 8.8 | | 0.251 | 0.563 |
| | | 35.2 | | 0.251 | 0.563 |
| 15 dB | 2.8 | 8.8 | 0.032 | 0.208 | 0.530 |
| ($\delta$ = 0.032) | | 35.2 | | 0.208 | 0.531 |
| | 7.0 | 8.8 | | 0.205 | 0.528 |
| | | 35.2 | | 0.205 | 0.528 |
| 18 dB | 2.8 | 8.8 | 0.016 | 0.180 | 0.508 |
| ($\delta$ = 0.016) | | 35.2 | | 0.181 | 0.509 |
| | 7.0 | 8.8 | | 0.175 | 0.503 |
| | | 35.2 | | 0.175 | 0.503 |
| 21 dB | 2.8 | 8.8 | 0.008 | 0.163 | 0.494 |
| ($\delta$ = 0.008) | | 35.2 | | 0.164 | 0.495 |
| | 7.0 | 8.8 | | 0.156 | 0.487 |
| | | 35.2 | | 0.156 | 0.487 |
| ∞ dB | 2.8 | 8.8 | 0.000 | 0.141 | 0.475 |
| ($\delta$ = 0.000) | | 35.2 | | 0.144 | 0.477 |
| | 7.0 | 8.8 | | 0.124 | 0.458 |
| | | 35.2 | | 0.125 | 0.459 |

TABLE 4

| Extinction Ratio | Desired Q Factor | $\sigma_{th}^2$ ($10^{-12}$ A$^2$) | Optimal Intensity Levels | | | |
|---|---|---|---|---|---|---|
| | | | $P_0/P_4$ | $P_1/P_4$ | $P_2/P_4$ | $P_3/P_4$ |
| 6 dB | 2.8 | 7.6 | 0.251 | 0.392 | 0.564 | 0.766 |
| ($\delta$ = 0.251) | | 30.4 | | 0.392 | 0.564 | 0.766 |
| | 7.0 | 7.6 | | 0.392 | 0.563 | 0.766 |
| | | 30.4 | | 0.392 | 0.563 | 0.766 |
| 9 dB | 2.8 | 7.6 | 0.126 | 0.267 | 0.459 | 0.704 |
| ($\delta$ = 0.126) | | 30.4 | | 0.267 | 0.459 | 0.704 |
| | 7.0 | 7.6 | | 0.267 | 0.459 | 0.704 |
| | | 30.4 | | 0.267 | 0.459 | 0.704 |
| 12 dB | 2.8 | 7.6 | 0.063 | 0.193 | 0.392 | 0.661 |
| ($\delta$ = 0.063) | | 30.4 | | 0.193 | 0.392 | 0.661 |
| | 7.0 | 7.6 | | 0.193 | 0.392 | 0.661 |
| | | 30.4 | | 0.193 | 0.392 | 0.661 |
| 15 dB | 2.8 | 7.6 | 0.032 | 0.149 | 0.349 | 0.633 |
| ($\delta$ = 0.032) | | 30.4 | | 0.149 | 0.349 | 0.633 |
| | 7.0 | 7.6 | | 0.147 | 0.347 | 0.631 |
| | | 30.4 | | 0.147 | 0.347 | 0.632 |
| 18 dB | 2.8 | 7.6 | 0.016 | 0.121 | 0.321 | 0.614 |
| ($\delta$ = 0.016) | | 30.4 | | 0.122 | 0.321 | 0.614 |
| | 7.0 | 7.6 | | 0.119 | 0.318 | 0.611 |
| | | 30.4 | | 0.119 | 0.318 | 0.611 |
| 21 dB | 2.8 | 7.6 | 0.008 | 0.105 | 0.303 | 0.611 |
| ($\delta$ = 0.008) | | 30.4 | | 0.106 | 0.303 | 0.602 |
| | 7.0 | 7.6 | | 0.101 | 0.298 | 0.597 |
| | | 30.4 | | 0.101 | 0.298 | 0.597 |
| ∞ dB | 2.8 | 8.8 | 0.000 | 0.082 | 0.276 | 0.582 |
| ($\delta$ = 0.000) | | 35.2 | | 0.083 | 0.278 | 0.584 |
| | 7.0 | 8.8 | | 0.071 | 0.261 | 0.571 |
| | | 35.2 | | 0.072 | 0.262 | 0.572 |

In a preferred embodiment of the system 20, signal-spontaneous beat noise dominates over other noises, in particular, over thermal noise in the electronic preamplifier 45. Thus, Eq. 13 makes the dominant contribution to the total noise variance given by Eq. 10, and the second term in Eq. 21 dominates over the first term. Hence, the intensity levels of the received multilevel optical signal 35 optimized under Algorithm 1 (32a) are close to those given by Eq. 33, and are approximately independent of the required Q factor and of the first term of Eq. 21 (i.e., of the parameter $\rho_{ind}$). In a preferred embodiment of the system 20, in order to minimize the required average power $P_{av}$ and peak received power $P_{M-1}$, we would also like to have the extinction ratio of the transmitter 23 as large as possible, i.e., $\delta$ as small as possible. In practice, however, the extinction ratio is often limited, and it is necessary to optimize the levels considering a nonzero value of $\delta$. In summary, for a wide range of preferred embodiments, the optimized intensity levels of the received multilevel optical signal 35 are nearly equal to those given by Eq. 33.

Table 2, Table 3 and Table 4 present examples of intensity levels optimized using Algorithm 1 (32a) for preferred embodiments of the system 20 using 3-PAM, 4-PAM and 5-PAM, respectively. All of the preferred embodiments described in Table 2, Table 3 and Table 4 are dominated by signal-spontaneous beat noise, so that the optimized intensity levels of the received multilevel optical signal 35 are nearly equal to those given by Eq. 33. In all cases described in Table 2, Table 3 and Table 4: the bit rate of the information bit stream 22 is 40 Gbps; the ASE power spectral density of the preamplified optical signal 40 is $S_{sp}$=2.6×10$^{-16}$ W/Hz; the gain of the optical preamplifier 37 is G=100 (corresponding to 20 dB); the responsivity and leakage current of the photodetector 43 are R=0.8 A/W and $I_d$=1 nA, respectively. In each of Table 2, Table 3 and Table 4, we consider two values of the Q factor achieved at all decision thresholds: Q=2.8 and Q=7.0. In each of Table 2, Table 3 and Table 4, we consider seven representative values of the transmitter extinction ratio parameter of the system 20: $\delta$=0.251, 0.126, 0.063, 0.032, 0.016, 0.008 and 0.000, corresponding to transmitter extinction ratios of 6 dB, 9 dB, 12 dB, 15 dB, 18 dB, 21 dB and ∞ dB, respectively.

In the systems described in Table 2, the number of transmitted intensity levels is M=3; the symbol rate of the transmitted multilevel optical signal 31 is 1/T=25.237 Gbaud; the bandwidth of the optical filter 41 is $\Delta v_{opt}$=45.4 GHz; and the noise bandwidth of the electrical preamplifier 45 is $\Delta f$=27.8 GHz. The input-referred noise variance of the electrical preamplifier 45 takes on two different values: $\sigma_{th}^2$=10.1×10$^{-12}$ A$^2$ and $\sigma_{th}^2$=40.5×10$^{-12}$ A$^2$. The received intensity levels optimized using Algorithm 1 (32a) are expressed in terms of ratios to the peak received intensity level $P_2$, i.e., $P_0/P_2$ and $P_1/P_2$. While Table 2 considers only specific values of the parameters governing noise in the system 20 and specific values of the desired Q factor, for typical systems 20 using 3-PAM in which the dominant impairments are signal-spontaneous beat noise and transmitter extinction ratio, for the specific values of the extinction ratio parameter $\delta$ considered in Table 2, the optimized ratios of received intensity levels $P_0/P_2$ and $P_1/P_2$ are close to those shown in Table 2. For typical systems 20 using 3-PAM in which the dominant impairments are signal-spontaneous beat noise and transmitter extinction ratio, for values of the extinction ratio parameter $\delta$ larger than 0.000 and not exceeding 0.251 (corresponding to extinction ratios less than ∞ dB and not less than 6 dB), the ratio $P_0/P_2$ is equal to $\delta$, and the optimized ratio $P_1/P_2$ lies between 0.272 and 0.564. By contrast, in systems 20 using 3-PAM in which the dominant impairments are signal-independent noise and transmitter extinction ratio, for the same range of values of $\delta$, the optimized ratio $P_1/P_2$ is at least 0.500. In one preferred embodiment of the present invention for 3-PAM (intensity levels $P_0$, $P_1$ and $P_2$) and the impairments as described for Table 2, the intensity level of $P_0$ has a range of 0.001 to 0.251 times the intensity level of $P_2$ and the intensity level of $P_1$ has a range of 0.272 to 0.499 times the intensity level of $P_2$.

In the systems described in Table 3, the number of transmitted intensity levels is M=4; the symbol rate of the transmitted multilevel optical signal 31 is 1/T=20 Gbaud; the bandwidth of the optical filter 41 is $\Delta v_{opt}$=36 GHz; and the noise bandwidth of the electrical preamplifier 45 is $\Delta f$=22 GHz. The input-referred noise variance of the electrical preamplifier 45 takes on two different values: $\sigma_{th}^2$=8.8×10$^{-12}$ A$^2$ and $\sigma_{th}^2$=35.2×10$^{-12}$ A$^2$. The received intensity levels optimized using Algorithm 1 (32a) are expressed in terms of ratios to the peak received intensity level $P_3$, i.e., $P_0/P_3$, $P_1/P_3$ and $P_2/P_3$. While Table 3 considers only specific values of the parameters governing noise in the system 20 and specific values of the desired Q factor, for typical systems 20 using 4-PAM in which the dominant impairments are signal-spontaneous beat noise and transmitter extinction ratio, for the specific values of the extinction ratio parameter $\delta$ considered in Table 3, the optimized ratios of received intensity levels $P_0/P_3$, $P_1/P_3$ and $P_2/P_3$ are close to those shown in Table 3. For typical systems 20 using 4-PAM in which the dominant impairments are signal-spontaneous beat noise and transmitter extinction ratio, for values of the extinction ratio parameter $\delta$ larger than 0.000 and not exceeding 0.251 (corresponding to extinction ratios less than ∞ dB and not less than 6 dB), the ratio $P_0/P_3$ is equal to $\delta$, the optimized ratio $P_1/P_3$ lies between 0.124 and 0.446, and the optimized ratio $P_2/P_3$ lies between 0.458 and 0.695. By contrast, in systems 20 using 4-PAM in which the dominant impairments are signal-independent noise and transmitter extinction ratio, for the same range of values of $\delta$, the optimized ratios $P_1/P_3$ and $P_2/P_3$ are greater than 0.333 and 0.666, respectively. In one preferred embodiment of the present invention for 4-PAM (intensity levels $P_0$, $P_1$, $P_2$ and $P_3$) and the impairments as described for Table 3, the intensity level of $P_0$ has a range of 0.001 to 0.251 times the intensity level of $P_3$, the intensity level of $P_1$ has a range of 0.124 to 0.333 times the intensity level of $P_3$, and the intensity level of $P_2$ has a range of 0.458 to 0.666 times the intensity level of $P_3$. It should also be understood that the intensity level $P_1$ is greater than the intensity level $P_0$.

In the systems described in Table 4, the number of transmitted intensity levels is M=5; the symbol rate of the transmitted multilevel optical signal 31 is 1/T=17.227 Gbaud; the bandwidth of the optical filter 41 is $\Delta v_{opt}$=31 GHz; and the noise bandwidth of the electrical preamplifier 45 is $\Delta f$=19 GHz. The input-referred noise variance of the electrical preamplifier 45 takes on two different values: $\sigma_{th}^2$=7.6×10$^{-12}$ A$^2$ and $\sigma_{th}^2$=30.4×10$^{-12}$ A$^2$. The received intensity levels optimized using Algorithm 1 (32a) are expressed in terms of ratios to the peak received intensity level $P_4$, i.e., $P_0/P_4$, $P_1/P_4$, $P_2/P_4$ and $P_3/P_4$. While Table 4 considers only specific values of the parameters governing noise in the system 20 and specific values of the desired Q factor, for typical systems 20 using 5-PAM in which the dominant impairments are signal-spontaneous beat noise and transmitter extinction ratio, for the specific values of the extinction ratio parameter $\delta$ considered in Table 4, the optimized ratios of received intensity levels $P_0/P_4$, $P_1/P_4$, $P_2/P_4$ and $P_3/P_4$ are close to those shown in Table 4. For typical systems 20 using 5-PAM in which the dominant impairments are signal-spontaneous beat noise and transmitter extinction ratio, for values of the extinction ratio parameter $\delta$ larger than 0.000 and not exceeding 0.251 (corresponding to extinction ratios less than ∞ dB and not less than 6 dB), the ratio $P_0/P_4$ is equal to $\delta$, the optimized ratio $P_1/P_4$ lies between 0.071 and 0.392, the optimized ratio $P_2/P_4$ lies between 0.261 and 0.564, and the optimized ratio $P_3/P_4$ lies between 0.571 and 0.766. By contrast, in systems 20 using 5-PAM in which the dominant impairments are signal-independent noise and transmitter extinction ratio, for the same range of values of $\delta$, the optimized ratios $P_1/P_4$, $P_2/P_4$ and $P_3/P_4$ are greater than 0.250, 0.500 and 0.750, respectively. In one preferred embodiment of the present invention for 5-PAM (intensity levels $P_0$, $P_1$, $P_2$, $P_3$ and $P_4$) and the impairments as described for Table 4, the intensity level $P_0$ has a range of 0.001 to 0.248 times the intensity level $P_4$, the intensity level $P_1$ has a range of 0.071 to 0.249 times the intensity level $P_4$, the intensity level $P_2$ has a range of 0.261 to 0.499 times the intensity level $P_4$, and the intensity level $P_3$ has a range of 0.571 to 0.749 times the intensity level $P_4$. It should also be understood that the intensity level $P_1$ is greater than the intensity level $P_0$.

Table 2, Table 3 and Table 4 illustrate that for any system in which signal-spontaneous beat noise and transmitter extinction ratio are the dominant impairments, for values of M and $\delta$ other than those considered in these tables, the optimized intensity levels are closely equal to those given by Eq. 33.

Now, we describe an analytical optimization of the transmitted intensity levels in the system 20 considering ISI, in addition to the following impairments, which were considered in Algorithm 1 (32a): signal-independent noise, signal-dependent noise having a variance proportional to the received intensity, and a finite transmitter extinction ratio. This optimization yields equal Q factors at all M−1 decision thresholds. We refer to this optimization as Algorithm 2 (32b). FIG. 3b, given the general reference number 101b, illustrates a portion of the optical communication system 20, showing that Algorithm 2 (32b) passes level-setting information 33 to the multilevel encoder 24 within the transmitter 23.

We approximate ISI as a noise term having equal variance at each received intensity level. Since the ISI in any particular received waveform scales with the peak received signal intensity, the ISI noise variance is proportional to the square of the peak received signal intensity. Thus, we add a term $\alpha P_{M-1}^2$ to Eq. 21, obtaining:

$$\sigma_k^2 = \sigma_{ind}^2 + \gamma P_k + \alpha P_{M-1}^2. \tag{Eq. 35}$$

Using Eq. 17, the Q factor at the kth decision threshold becomes:

$$Q_k = \frac{RG(P_k - P_{k-1})}{\sqrt{\sigma_{ind}^2 + \gamma P_k + \alpha P_{M-1}^2} + \sqrt{\sigma_{ind}^2 + \gamma P_{k-1} + \alpha P_{M-1}^2}} \qquad (Eq.\ 36)$$

and using Eq. 25 and Eq. 26, we can rewrite Eq. 36 as:

$$C_k = \sqrt{\rho_{ind} + P_k + \beta P_{M-1}^2} - \sqrt{\rho_{ind} + P_{k-1} + \beta P_{M-1}^2}, \qquad (Eq.\ 37)$$

where we have defined $\beta = \alpha/\gamma$. Requiring $Q_k = Q$ (equivalent to $C_k = C$) for all $k=1, \ldots, M-1$, we can find the peak power $P_{M-1}$ by solving:

$$\rho_{ind} + P_{M-1} + \beta P_{M-1}^2 = [(M-1)C + \sqrt{\rho_{ind} + P_0 + \beta P_{M-1}^2}]^2. \qquad (Eq.\ 38)$$

The solution is given by:

$$P_{M-1} = \frac{(M-1)C[(1+\delta)(M-1)C + 2(\rho_{ind}(1-\delta) + (\delta - 4\beta\rho_{ind})(M-1)^2C^2 + \beta(M-1)^4C^4)^{\frac{1}{2}}]}{((1-\delta)^2 - 4\beta(M-1)^2C^2)} \qquad (Eq.\ 39)$$

and $$P_k = (kC + \sqrt{\rho_{ind} + \delta P_{M-1} + \beta P_{M-1}^2})^2 - \rho_{ind} - \beta P_{M-1}^2, k=0 \ldots, M-2. \qquad (Eq.\ 40)$$

The combination of Eq. 39 and Eq. 40 is the Algorithm 2 (32b).

Under some conditions, e.g., when impairments exhibiting certain types of dependence upon the received intensity are considered, and/or it is required to achieve different Q factors at different decision thresholds, then it may not be possible to optimize the transmitted intensity levels using an analytical technique. Nonetheless, numerical optimization of the transmitted intensity levels is possible.

We now describe an iterative numerical optimization of the transmitted intensity levels in the system 20 that can take into account the following impairments: signal-independent noise, signal-dependent noise having a variance that is a non-decreasing function of all of the received intensity levels, and a finite transmitter extinction ratio. This optimization procedure can be employed to obtain equal or unequal Q factors at the M−1 decision thresholds. We refer to this optimization as Algorithm 3 (32c). FIG. 3c, given the general reference number 101c, illustrates a portion of the optical communication system 20, showing that Algorithm 3 (32c) passes level-setting information 33 to the multilevel encoder 24 within the transmitter 23. In Algorithm 3 (32c), instead of requiring $\sigma_k^2$ to be in the form of Eq. 21, as in Algorithm 1 (32a), we allow $\sigma_k^2$ to take on the more general form:

$$\sigma_k^2 = \sigma_k^2(P_0, P_1, \ldots, P_{M-1}), \qquad (Eq.\ 41)$$

and require that $$\frac{\partial \sigma_k^2}{\partial P_l} \geq 0, k, l = 0, \ldots, M-1. \qquad (Eq.\ 42)$$

Note that the $\sigma_k^2$ expressed by Eq. 41 is intended to include all noises, both signal-independent and signal-dependent. Using Eq. 17, the Q factor at the kth decision threshold becomes:

$$Q_k = \frac{RG(P_k - P_{k-1})}{\sigma_k(P_0, P_1, \ldots, P_{M-1}) + \sigma_{k-1}(P_0, P_1, \ldots, P_{M-1})}. \qquad (Eq.\ 43)$$

Given particular functional forms for the M noise variances, a transmitter extinction ratio parameter δ and a set of required Q factors $Q_k$, $k=1, \ldots, M-1$, Algorithm 3 (32c) is performed as follows:

1. Choose a small positive number ϵ as a stopping condition.
2. Define an iteration index i and let i=0.
3. Choose the initial values $P_1^{(0)} = P_{M-1}^{(0)} = 0$.
4. Let i=i+1.
5. Calculate $P_0^{(i)} = \delta \cdot P_{M-1}^{(i-1)}$.
6. For k from 1 to M−1, let:

$$P_k^{(i)} = P_{k-1}^{(i)} + \frac{Q_k}{RG}(\sigma_k(P_0^{(i)}, \ldots, P_{k-1}^{(i)}, P_k^{(i-1)}, \ldots, P_{M-1}^{(i-1)}) + \sigma_{k-1}(P_0^{(i)}, \ldots, P_{k-1}^{(i)}, P_k^{(i-1)}, \ldots, P_{M-1}^{(i-1)}))$$

7. If $(P_{M-1}^{(i)} - P_{M-1}^{(i-1)})/P_{M-1}^{(i)} > \epsilon$, go to step 4.
8. Stop.

In Algorithm 3 (32c), if the condition in Eq. 42 is satisfied, then $P_k^{(i)} \geq P_k^{(i-1)}$, $k=0, \ldots, M-1$, and the intensity levels will either converge or increase to infinity as i is increased.

A first application of Algorithm 3 (32c) is to optimize the transmitted intensity levels taking account of noise (signal-independent plus signal-dependent) in the form of Eq. 21, as well as a finite transmitter extinction ratio to achieve unequal Q factors at the M−1 decision thresholds (Algorithm 1 (32a) would be applicable if the goal were to achieve equal Q factors). Note that the noise given by Eq. 21 satisfies the condition of Eq. 42. In this application, Algorithm 3 (32c) will always converge to a finite set of intensity levels.

A second application of Algorithm 3 (32c) is to optimize the transmitted intensity levels taking account of intensity noise in a transmitter light source, in addition to the other forms of signal-independent and signal-independent noise that are included in Eq. 21. In this application, we should let $\sigma_k^2$ take the form:

$$\sigma_k^2 = \sigma_{ind}^2 + \gamma P_k + \eta P_k^2, \qquad (Eq.\ 44)$$

which satisfies the condition of Eq. 42. In this application, we can also take account of a finite transmitter extinction ratio and achieve either equal or unequal Q factors at the M−1 decision thresholds. In this application, Algorithm 3 (32c) will converge to a finite set of intensity levels provided that the parameter η is sufficiently small (a condition that must be satisfied in practice in any case to insure that transmitter intensity noise does not substantially impair a system).

Now, we describe an iterative numerical optimization of the transmitted intensity levels in the system 20 that can take into account ISI, in addition to the impairments that were considered in Algorithm 3 (32c) (i.e., a finite transmitter extinction ratio and signal-independent plus signal-dependent noise of the form of Eq. 41). We consider noise variances $\sigma_k^2$, $k=0, \ldots, M-1$ of the general form of Eq. 41 and satisfying Eq. 42, and include in each of the noise variances $\sigma_k^2$, $k=0, \ldots M-1$ an ISI noise term whose variance is proportional to the square of the peak received signal intensity, which is of the form:

$$\alpha_k P_{M-1}^2, k=0, \ldots M-1. \qquad (Eq.\ 45)$$

We observe that the term specified in Eq. 45 is compatible with the condition in Eq. 42. To describe a system having different ISI at different received intensity levels, we can choose the values of $\alpha_k$ to be different; if the ISI is equal at all of the received intensity levels, we can choose the values of $\alpha_k$ to be equal. This optimization can be used to obtain either equal or unequal Q factors at the M−1 decision thresholds. We refer to this optimization as Algorithm 4 (32d). Mathematically, Algorithm 4 (32d) is actually a special case of Algorithm 3 (32c). FIG. 3d, given the general reference number 101d, illustrates a portion of the optical communication system 20, showing that Algorithm 4 (32d) passes level-setting information 33 to the multilevel encoder 24 within the transmitter 23.

Given a functional form for the noise variances including terms of the form of Eq. 45, a transmitter extinction ratio parameter $\delta$ and a set of required Q factors $Q_k$, k=1, ..., M−1, Algorithm 4 (32d) is performed as follows:

1. Choose a small positive number $\epsilon$ as a stopping condition.
2. Define an iteration index i and let i=0.
3. Choose the initial values $P_1^{(0)} = \ldots = P_{M-1}^{(0)} = 0$.
4. Let i=i+1.
5. Calculate $p_0^{(i)} = \delta \cdot P_{M-1}^{(i-1)}$.
6. For k from 1 to M−1, let:

$$P_k^{(i)} = P_{k-1}^{(i)} + \frac{Q_k}{RG}(\sigma_k(P_0^{(i)}, \ldots, P_{k-1}^{(i)}, P_k^{(i-1)}, \ldots, P_{M-1}^{(i-1)}) +$$
$$\sigma_{k-1}(P_0^{(i)}, \ldots, P_{k-1}^{(i)}, P_k^{(i-1)}, \ldots, P_{M-1}^{(i-1)}))$$

7. If $(P_{M-1}^{(i)} - P_{M-1}^{(i-1)})/P_{M-1}^{(i)} > \epsilon$, go to step 4.
8. Stop.

In Algorithm 4 (32d), if the condition in Eq. 42 is satisfied, then $P_k^{(i)} \geq P_k^{(i-1)}$, k=0, ..., M−1, and the intensity levels will either converge or increase to infinity as i is increased.

A first application of Algorithm 4 (32d) is to optimize the transmitted intensity levels taking account of the signal-independent plus signal-dependent noises described in Eq. 21, in addition to the ISI-induced noise described by Eq. 45, as well as a finite transmitter extinction ratio. In this application, we employ a set of noise variances given by:

$$\sigma_k^2 = \sigma_{ind}^2 + \gamma P_k + \alpha_k P_{M-1}^2, \quad \text{(Eq. 46)}$$

where the $\alpha_k$ can be equal or unequal. We can perform the optimization to achieve equal or unequal Q factors at the M−1 decision thresholds. Although the intensity levels will not converge to finite values for arbitrarily chosen $\alpha_k$, the levels will converge for $\alpha_k$ small enough to be of practical interest (i.e., when the ISI-induced penalties are small, as is desired in practice). Note that if all of the $\alpha_k$ are equal and all of the $Q_k$ are equal, we can simply use Algorithm 2 (32b).

A second application of Algorithm 4 (32d) is to optimize the transmitted intensity levels taking account of the signal-independent plus signal-dependent noises described in Eq. 44 (which includes light source intensity noise), in addition to the ISI-induced noise described by Eq. 45, as well as a finite transmitter extinction ratio. We use a set of noise variances given by:

$$\sigma_k^2 = \sigma_{ind}^2 + \gamma P_k + \eta P_k^2 + \alpha_k P_{M-1}^2, \quad \text{(Eq. 47)}$$

where the $\alpha_k$ can be equal or unequal. We can perform the optimization to achieve equal or unequal Q factors at the M−1 decision thresholds.

Figure 3E:
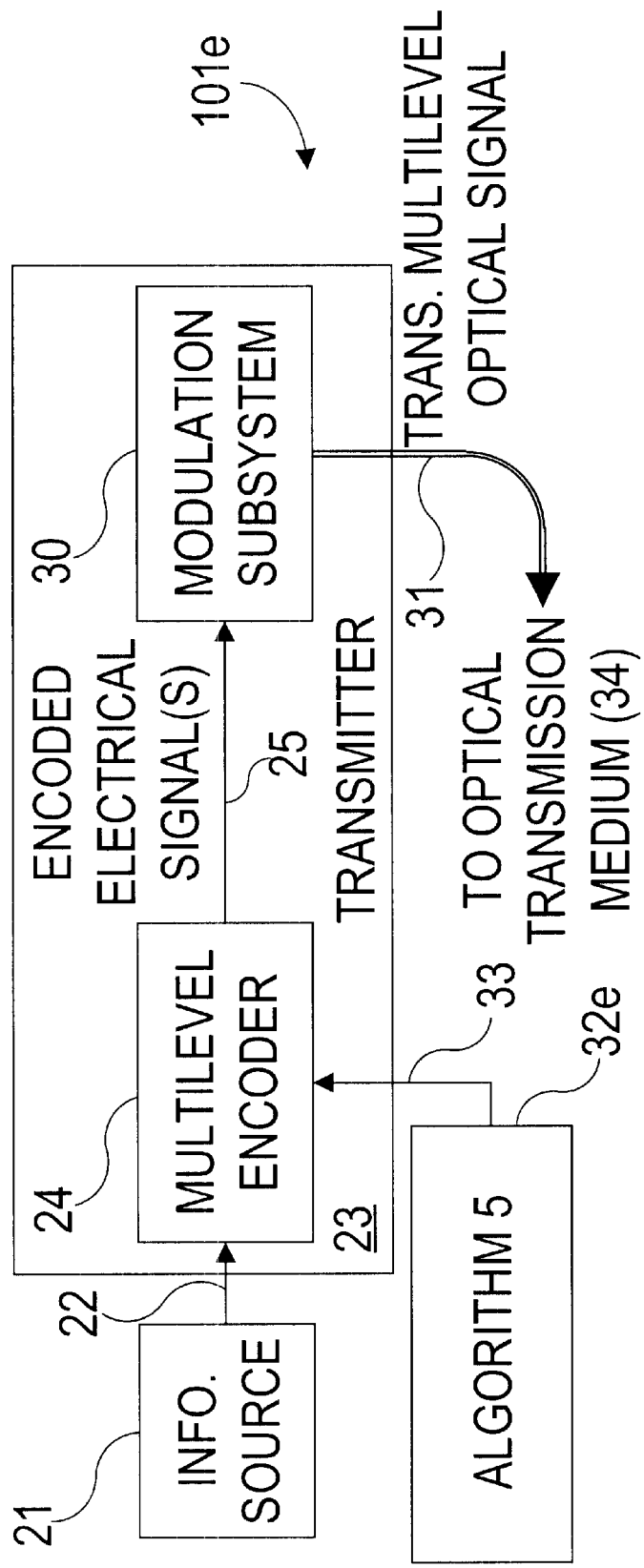
FIG. 3e is a portion of the optical communication system shown in FIG. 1, including a transmitter transmitting multilevel signals and a level-setting Algorithm 5 for optimizing the multilevel signals under the present invention.

In Algorithm 2 (32b) and Algorithm 4 (32d), we model ISI in terms of noise. In some applications, it is better to model ISI in terms of "eye closure", a moving together of adjacent received intensity levels, than in terms of noise. We now describe Algorithm 5 (32e), an iterative numerical optimization of the transmitted intensity levels in the system 20 that can take into account the following impairments: ISI treated in terms of "eye closure", signal-independent noise, signal-dependent noise having a variance that is a non-decreasing function of all of the received intensity levels, and a finite transmitter extinction ratio. This optimization procedure can be employed to obtain equal or unequal Q factors at the M−1 decision thresholds. FIG. 3e, given the general reference number 101e, illustrates a portion of the optical communication system 20, showing that Algorithm 5 (32e) passes level-setting information 33 to the multilevel encoder 24 within the transmitter 23.

In Algorithm 4 (32d), as in Algorithm 3 (32c), we allow the noise variances $\sigma_k^2$, k=0, ... M−1 to take on the general form of Eq. 41, and require that the condition of Eq. 42 be satisfied. In the absence of ISI, the kth received intensity level is $P_k$. When ISI is present, the kth received intensity level splits into multiple levels:

$$P_{k,1}, P_{k,2}, \ldots, P_{k,N_k-1}, P_{k,N_k}, \quad \text{(Eq. 48)}$$

where $N_k$ is the number of levels (in practice, $N_k$ may be so large that the kth intensity level is received as a continuum of levels), and where we have ordered the levels from smallest to largest:

$$P_{k,1} < P_{k,2} < \ldots < P_{k,N_k-1} < P_{k,N_k}, \quad \text{(Eq. 49)}$$

Similarly, received intensity level k−1 is split into $N_{k-1}$ levels:

$$P_{k-1,1}, P_{k-1,2}, \ldots, P_{k-1,N_{k-1}-1}, P_{k-1,N_{k-1}}, \quad \text{(Eq. 50)}$$

which are ordered as:

$$P_{k-1,1} < P_{k-1,2} < \ldots < P_{k-1,N_{k-1}-1} < P_{k-1,N_{k-1}}. \quad \text{(Eq. 51)}$$

At the kth decision threshold, the Q factor is modified from Eq. 43 to:

$$Q_k = \frac{RG(P_{k,1} - P_{k-1,N_{k-1}})}{\sigma_k(P_0, P_1, \ldots, P_{M-1}) + \sigma_{k-1}(P_0, P_1, \ldots, P_{M-1})}. \quad \text{(Eq. 52)}$$

The "eye closure" at the kth decision threshold caused by ISI (in terms of received photocurrent) is the difference between the numerators of Eq. 43 and Eq. 52. This eye closure is proportional to the peak received photocurrent in the absence of ISI, $RGP_{M-1}$, so we denote this eye closure as $RGe_k P_{M-1}$, where $e_k$ is a parameter describing the ISI-induced "eye closure" at the kth level. Thus, $e_k$ is defined by the expression:

$$RGe_k P_{M-1} = RG[(P_k - P_{k,1}) + (P_{k-1,N_{k-1}} - P_{k-1})]. \quad \text{(Eq. 53)}$$

We can rewrite the Q factor at the kth decision threshold as:

$$Q_k = \frac{RG(P_k - P_{k-1} - e_k P_{M-1})}{\sigma_k(P_0, P_1, \ldots, P_{M-1}) + \sigma_{k-1}(P_0, P_1, \ldots, P_{M-1})}. \quad \text{(Eq. 54)}$$

A necessary and sufficient condition to have an "eye opening" at each of the M−1 decision thresholds is:

$$\sum_{k=1}^{M-1} e_k < \frac{M-1}{M}. \quad \text{(Eq. 55)}$$

Given functional forms for the M noise variances (as in Eq. 41), a set of ISI parameters $e_k$, k=1, . . . , M−1, a transmitter extinction ratio parameter δ and a set of required Q factors $Q_k$, k=1, . . . , M−1, Algorithm 5 (32e) is performed as follows:

1. Choose a small positive number ε as a stopping condition.
2. Define an iteration index i and let i=0.
3. Choose the initial values $P_1^{(0)} = P_{M-1}^{(0)} = 0$.
4. Let i=i+1.
5. Calculate $p_0^{(i)} = \delta \cdot P_{M-1}^{(i-1)}$.
6. For k from 1 to M−1, let:

$$P_k^{(i)} = P_{k-1}^{(i)} + e_k P_{M-1}^{(i-1)} + \frac{Q_k}{RG}(\sigma_k(P_0^{(i)}, \ldots, P_{k-1}^{(i)}, P_k^{(i-1)}, \ldots, P_{M-1}^{(i-1)}) +$$

$$\sigma_{k-1}(P_0^{(i)}, \ldots, P_{k-1}^{(i)}, P_k^{(i-1)}, \ldots, P_{M-1}^{(i-1)}))$$

7. If $(P_{M-1}^{(i)} - P_{M-1}^{(i-1)})/P_{M-1}^{(i)} > \epsilon$, go to step 4.
8. Stop.

In Algorithm 5 (32e), if the condition in Eq. 42 is satisfied, then $p_k^{(i)} \geq p_k^{(i-1)}$, k=0, . . . , M−1, and the intensity levels will either converge or increase to infinity as i is increased.

A first application of Algorithm 5 (32e) is to optimize the transmitted intensity levels taking account of the signal-independent plus signal-dependent noises described in Eq. 21, which satisfies the condition in Eq. 42, in addition to ISI-induced "eye closure" and a finite transmitter extinction ratio. We can perform the optimization to achieve equal or unequal Q factors at the M−1 decision thresholds. As long as the condition in Eq. 55 is satisfied, the intensity levels will converge to finite values.

A second application of Algorithm 5 (32e) is to optimize the transmitted intensity levels taking account of the signal-independent plus signal-dependent noises described in Eq. 44, which satisfies the condition in Eq. 42, in addition to ISI-induced "eye closure" and a finite transmitter extinction ratio. We can perform the optimization to achieve equal or unequal Q factors at the M−1 decision thresholds. In this application, the intensity levels will converge to finite values provided the condition in Eq. 55 is satisfied and provided the parameter η is sufficiently small (a condition that must be satisfied in practice to insure that transmitter intensity noise does not substantially impair a system).

In a practical implementation of the multilevel decoder 51, the M−1 decision thresholds may possess "dead zones" or "ambiguity regions", within which decisions made by the decoder 51 are unreliable. More specifically, when a given value of the signal 50 lies within the "dead zone" associated with a particular threshold, a decision made by the decoder 51 may not correctly reflect whether the given value of the signal 50 lies below or above the particular threshold. These "dead zones" may lead to a potentially significant degradation in error probability, especially at high symbol rates. For the set of M−1 decision thresholds given by Eq. 15, let the corresponding set of "dead zones" have peak-to-peak widths given by:

$$\Delta I_{th,k}, k=1, \ldots, M-1. \quad \text{(Eq. 56)}$$

Algorithm 5 (32e) can be used to optimize the transmitted intensity levels taking account of "dead zones" in combination with any or all of the other impairments described above in conjunction with Algorithm 5 (32e), i.e., ISI treated in terms of "eye closure", signal-independent noise, signal-dependent noise having a variance that is a non-decreasing function of all of the received intensity levels, and a finite transmitter extinction ratio. In order to use Algorithm 5 (32e) in this way, we modify the expression for $e_k$ from that given by Eq. 53 to:

$$RGe_k P_{M-1} = RG[(P_k - P_{k,1}) + (P_{k-1, N_{k-1}} - P_{k-1})] - \Delta I_{th,k} \quad \text{(Eq. 57)}$$

and then perform Steps 1 through 8 of Algorithm 5 (32e), as described above.

In the present invention, the level-setting algorithm 32 determines the optimized set of intensity levels of the transmitted multilevel optical signal 31, taking account of relevant impairments in the optical communication system 20. Relevant system impairments can be characterized separately or in one or more combinations that are germane to the particular algorithm 32 used to design the transmitted intensity levels.

In some embodiments of the invention, relevant system impairments can be characterized in part or fully before the components of the communication system 20 are assembled into the system 20. This characterization of impairments can be performed using one or more of various techniques, including measurement, semi-empirical modeling, numerical simulation, and theoretical modeling. In this case, the level-setting algorithm 32 can be performed as part of the process of designing and setting up the system 20.

In some embodiments, relevant system impairments can be characterized in part or fully after the components of the communication system 20 are assembled into the system 20. In this case, impairments can be characterized using one or more of various techniques, including measurement, semi-empirical modeling, numerical simulation, and theoretical modeling.

When relevant impairments in the system 20 are subject to uncertainty or variations over time, it may be desirable to estimate relevant impairments at the receiver 36 and pass relevant information to the level-setting algorithm 32. Accordingly, within the receiver 36, at least one impairment estimator 54 monitors the multilevel electrical signal 50 and/or one or more other signal(s) 55 extracted from 50 by the multilevel decoder 51 to estimate relevant impairments. In some cases, impairments may be estimated by the impairment estimator 54 in response to a transmitted multilevel optical signal 31 that represents arbitrary or random data. In some cases, performance of the impairment estimator 54 can be enhanced if the transmitted multilevel optical signal 31 comprises a specific training sequence that is known in advance to the estimator 54. The impairment estimator can employ various methods. As one example, the impairment estimator 54 can: form a histogram of values of the received photocurrent 44; partition the histogram into M sub-histograms containing values of the received photocurrent 44 clustered near the received photocurrent levels $I_k$, k=0, . . . , M−1; and, considering each sub-histogram separately, use standard numerical techniques to estimate the received photocurrent levels $I_k$, k=0, . . . , M−1 and the noise variances $\sigma_k^2$, k=0, . . . , M−1.

An impairment estimator output 56, which comprises relevant information on the impairments, is passed to the level-setting algorithm 32. The level-setting algorithm 32 may be performed at the transmitter 23, in which case, the impairment estimator output 56 is transmitted through a reverse channel 60 to the level-setting algorithm 32 (as shown in FIG. 1). Alternatively, the level-setting algorithm 32 can be performed at the receiver or at some other location(s); in this case, the level-setting information 33 may be transmitted through a reverse channel 60 to the multilevel encoder 24 (this represents a slight variation from FIG. 1). The reverse channel 60 may make use of the optical transmission medium 34 within the system 20 or an optical transmission medium within a similar optical communication system (not shown in FIG. 1). Alternatively, the reverse channel 60 may make use of another communication medium, such as a wireline channel or a wireless channel.

In some embodiments, it is advantageous to determine a worst-case combination of impairments under which the system 20 is expected to perform at a desired level, and to design the transmitted intensity levels taking account of the worst-case combination.

The multilevel encoder 24 can use various techniques to adjust the levels of the encoded electrical signal(s) 25 in response to the level-setting information 33 so as to effect an adjustment of the intensity levels of the transmitted multilevel optical signal 31. In practice, these adjustments will be made on a time scale that is very slow in comparison to the symbol rate 1/T of the transmitted multilevel optical signal 31. As one example, the multilevel encoder 24 can be equipped with a bank of M−1 adjustable current sources, each adjustable by a digital-to-analog converter, in response to a digital representation of the level-setting information 33, to yield a set of M−1 currents that govern the M−1 nominally nonzero intensity levels of the transmitted multilevel optical signal 31. Each current source can be connected via one of a set of M−1 switches to a current summing junction, which forms a sum that governs the value of the encoded electrical signal(s) 25. By opening and closing the switches in response to the information bit stream 22, the multilevel encoder 24 can generate the encoded electrical signal(s) 25.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An optical transmission system, comprising:
a modulation subsystem for launching an optical signal having intensity levels responsive to encoded levels, said intensity levels having unequal spacings for substantially compensating for a combination of impairments including a signal dependent noise having variances linearly proportional to said intensity levels, respectively, and a transmitter extinction ratio; and
an encoder for using impairment information indicative of said combination of said impairments for converting representations of data into said encoded levels.

2. The system of claim 1, wherein:
said combination of said impairments further includes a signal independent noise.

3. The system of claim 1, wherein:
said combination of said impairments further includes an intersymbol interference.

4. The system of claim 1, wherein:
said combination of said impairments further includes a signal independent noise and an intersymbol interference.

5. The system of claim 1, wherein:
said combination of said impairments further includes a detection threshold ambiguity.

6. The system of claim 1, wherein:
said intensity levels include first, second, and third said intensity levels, said first intensity level having a range of 0.001 to 0.251 of said third intensity level and said second intensity level having a range of 0.272 to 0.499 of said third intensity level.

7. The system of claim 1, wherein:
said intensity levels include first, second, third, and fourth said intensity levels, said first intensity level having a range of 0.001 to 0.251 of said fourth intensity level, said second intensity level being greater than said first intensity level and having a range of 0.124 to 0.333 of said fourth intensity level, and said third intensity level having a range of 0.458 to 0.666 of said fourth intensity level.

8. The system of claim 1, wherein:
said intensity levels include first, second, third, fourth, and fifth said intensity levels, said first intensity level having a range of 0.001 to 0.248 of said fifth intensity level, said second intensity level being greater than said first intensity level and having a range of 0.071 to 0.249 of said fifth intensity level, said third intensity level having a range of 0.261 to 0.499 of said fifth intensity level, and said fourth intensity level having a range of 0.571 to 0.749 of said fifth intensity level.

9. The system of claim 1, further comprising:
algorithm 1 means for controlling the encoder for converting said representations of said data into said encoded levels for providing said intensity levels.

10. The system of claim 1, further comprising:
algorithm 2 means for controlling the encoder for converting said representations of said data into said encoded levels for providing said intensity levels.

11. The system of claim 1, further comprising:
algorithm 3 means for controlling the encoder for converting said representations of said data into said encoded levels for providing said intensity levels.

12. The system of claim 1, further comprising:
algorithm 4 means for controlling the encoder for converting said representations of said data into said encoded levels for providing said intensity levels.

13. The system of claim 1, further comprising:
algorithm 5 means for controlling the encoder for converting said representations of said data into said encoded levels for providing said intensity levels.

14. The system of claim 1, further comprising:
a receiver for receiving a representation of said optical signal through an optical medium and providing representations of said data.

15. The system of claim 14, wherein:
the receiver includes a signal impairment estimator for determining said impairment information from said received representation of said optical signal.

16. The system of claim 15, further comprising:
a reverse channel for communicating said impairment information from said signal impairment estimator to said encoder.

17. The system of claim 15, wherein:
the modulation subsystem is further for launching an optical training signal; and
the signal impairment estimator is further for receiving a representation of said optical training signal and using said received representation of said optical training signal for calculating said impairment information.

18. An optical transmission system, comprising:
a modulation subsystem for launching an optical signal having intensity levels responsive to encoded levels, said intensity levels having unequal spacings for substantially compensating for a combination of impairments including a signal independent noise, at least one signal dependent noise, and at least one of (i) a transmitter extinction ratio, (ii) an intersymbol interference, and (iii) a detection threshold ambiguity; and an encoder for using impairment information indicative of said combination of said impairments for converting representations of data into said encoded levels.

19. The system of claim 18, wherein:

said at least one signal dependent noise includes a first signal dependent noise having variances substantially directly proportional to said intensity levels, respectively.

20. The system of claim 18, wherein:

said at least one signal dependent noise includes a second signal dependent noise having variances substantially proportional to squares of said intensity levels, respectively.

21. The system of claim 18, wherein:

said combination of said impairments includes both of said intersymbol interference and said transmitter extinction ratio.

22. The system of claim 18, wherein:

said intensity levels include first, second, and third said intensity levels, said first intensity level having a range of 0.001 to 0.251 of said third intensity level and said second intensity level having a range of 0.272 to 0.499 of said third intensity level.

23. The system of claim 18, wherein:

said intensity levels include first, second, third, and fourth said intensity levels, said first intensity level having a range of 0.001 to 0.251 of said fourth intensity level, said second intensity level being greater than said first intensity level and having a range of 0.124 to 0.333 of said fourth intensity level, and said third intensity level having a range of 0.458 to 0.666 of said fourth intensity level.

24. The system of claim 18, wherein:

said intensity levels include first, second, third, fourth, and fifth said intensity levels, said first intensity level having a range of 0.001 to 0.248 of said fifth intensity level, said second intensity level being greater than said first intensity level and having a range of 0.071 to 0.249 of said fifth intensity level, said third intensity level having a range of 0.261 to 0.499 of said fifth intensity level, and said fourth intensity level having a range of 0.571 to 0.749 of said fifth intensity level.

25. The system of claim 18, further comprising:

algorithm 1 means for controlling the encoder for converting said representations of said data into said encoded levels for providing said intensity levels.

26. The system of claim 18, further comprising:

algorithm 2 means for controlling the encoder for converting said representations of said data into said encoded levels for providing said intensity levels.

27. The system of claim 18, further comprising:

algorithm 3 means for controlling the encoder for converting said representations of said data into said encoded levels for providing said intensity levels.

28. The system of claim 18, further comprising:

algorithm 4 means for controlling the encoder for converting said representations of said data into said encoded levels for providing said intensity levels.

29. The system of claim 18, further comprising:

algorithm 5 means for controlling the encoder for converting said representations of said data into said encoded levels for providing said intensity levels.

30. The system of claim 18, further comprising:

a receiver for receiving a representation of said optical signal through an optical medium and providing representations of said data.

31. The system of claim 30, wherein:

the receiver includes a signal impairment estimator for determining said impairment information from said received representation of said optical signal.

32. The system of claim 31, further comprising:

a reverse channel for communicating said impairment information from said signal impairment estimator to said encoder.

33. The system of claim 31, wherein:

the modulation subsystem is further for launching an optical training signal; and the signal impairment estimator is further for receiving a representation of said optical training signal and using said received representation of said optical training signal for calculating said impairment information.

34. An optical transmission method, comprising:

launching an optical signal having intensity levels responsive to encoded levels, said intensity levels having unequal spacings for substantially compensating for a combination of impairments including a signal dependent noise having variances linearly proportional to said intensity levels, respectively, and a transmitter extinction ratio; and converting input representations of data into said encoded levels using impairment information indicative of said combination of said impairments.

35. The method of claim 34, wherein:

said combination of said impairments further includes a signal independent noise.

36. The method of claim 34, wherein:

said combination of said impairments further includes an intersymbol interference.

37. The method of claim 34, wherein:

said combination of said impairments further includes a signal independent noise and an intersymbol interference.

38. The method of claim 34, wherein:

said combination of said impairments further includes a detection threshold ambiguity.

39. The method of claim 34, wherein:

said intensity levels include first, second, and third said intensity levels, said first intensity level having a range of 0.001 to 0.251 of said third intensity level and said second intensity level having a range of 0.272 to 0.499 of said third intensity level.

40. The method of claim 34, wherein:

said intensity levels include first, second, third, and fourth said intensity levels, said first intensity level having a range of 0.001 to 0.251 of said fourth intensity level, said second intensity level being greater than said first intensity level and having a range of 0.124 to 0.333 of said fourth intensity level, and said third intensity level having a range of 0.458 to 0.666 of said fourth intensity level.

41. The method of claim 34, wherein:

said intensity levels include first, second, third, fourth, and fifth said intensity levels, said first intensity level having a range of 0.001 to 0.248 of said fifth intensity level, said second intensity level being greater than said first intensity level and having a range of 0.071 to 0.249 of said fifth intensity level, said third intensity level having a range of 0.261 to 0.499 of said fifth intensity level, and said fourth intensity level having a range of 0.571 to 0.749 of said fifth intensity level.

42. The method of claim 34, wherein:

converting said input representations of said data includes converting said representations of said data into said encoded levels for providing said intensity levels according to $$P_{M-1} = \frac{(M-1)C[(1+\delta)(M-1)C + 2(\rho_{ind}(1-\delta)^2 + \delta(M-1)^2C^2)^{1/2}]}{(1-\delta)^2}$$

and $$P_k = (kC + \sqrt{\rho_{ind} + \delta \cdot P_{M-1}})^2 - \rho_{ind}, \ k=0 \ldots, M-2.$$

43. The method of claim 34, wherein:

converting said input representations of said data includes converting said representations of said data into said encoded levels for providing said intensity levels according to $$P_{M-1} = \frac{(M-1)C[(1+\delta)(M-1)C + 2(\rho_{ind}(1-\delta)^2 + (\delta - 4\beta\rho_{ind})(M-1)^2C^2 + \beta(M-1)^4C^4)^{1/2}]}{(1-\delta)^2 - 4\beta(M-1)^2C^2}$$

and $$P_k = (kC + \sqrt{\rho_{ind} + \delta P_{M-1} + \beta P_{M-1}^2})^2 - \rho_{ind} \beta P_M, \ k=0 \ldots, M-2.$$

44. The method of claim 34, wherein:

converting said input representations of said data includes converting said representations of said data into said encoded levels for providing said intensity levels according to $$P_0^{(i)} = \delta \cdot P_{M-1}^{(i-1)}$$

and $$P_k^{(i)} = P_{k-1}^{(i)} + \frac{Q_k}{RG}(\sigma_k(P_0^{(i)}, \ldots, P_{k-1}^{(i)}, P_k^{(i-1)}, \ldots, P_{M-1}^{(i-1)}) + \sigma_{k-1}(P_0^{(i)}, \ldots, P_{k-1}^{(i)}, P_k^{(i-1)}, \ldots, P_{M-1}^{(i-1)}))$$

and if $$(P_{M-1}^{(i)} - P_{M-1}^{(i-1)})/P_{M-1}^{(i)} > \varepsilon, \text{ try next } i.$$

45. The method of claim 34, wherein:

converting said input representations of said data includes converting said representations of said data into said encoded levels for providing said intensity levels according to $$P_0^{(i)} = \delta \cdot P_{M-1}^{(i-1)}$$

and $$P_k^{(i)} = P_{k-1}^{(i)} + \frac{Q_k}{RG}(\sigma_k(P_0^{(i)}, \ldots, P_{k-1}^{(i)}, P_k^{(i-1)}, \ldots, P_{M-1}^{(i-1)}) + \sigma_{k-1}(P_0^{(i)}, \ldots, P_{k-1}^{(i)}, P_k^{(i-1)}, \ldots, P_{M-1}^{(i-1)}))$$

and if $$(P_{M-1}^{(i)} - P_{M-1}^{(i-1)})/P_{M-1}^{(i)} > \varepsilon, \text{ try next } i.$$

46. The method of claim 34, wherein:

converting said input representations of said data includes converting said representations of said data into said encoded levels for providing said intensity levels according to $$P_0^{(i)} = \delta \cdot P_{M-1}^{(i-1)}$$

and $$P_k^{(i)} = P_{k-1}^{(i)} e_k P_{M-1}^{(i-1)} + \frac{Q_k}{RG}(\sigma_k(P_0^{(i)}, \ldots, P_{k-1}^{(i)}, P_k^{(i-1)}, \ldots, P_{M-1}^{(i-1)}) + \sigma_{k-1}(P_0^{(i)}, \ldots, P_{k-1}^{(i)}, P_k^{(i-1)}, \ldots, P_{M-1}^{(i-1)}))$$

and if $$(P_{M-1}^{(i)} - P_{M-1}^{(i-1)})/P_{M-1}^{(i)} > \varepsilon, \text{ try next } i.$$

47. The method of claim 34, further comprising:

receiving a representation of said optical signal through an optical medium; and determining output representations of said data.

48. The method of claim 47, further comprising:

determining said impairment information from said received representation of said optical signal.

49. The method of claim 48, further comprising:

communicating said impairment information for use in converting said input representations of said data into said encoded levels.

50. The method of claim 48, further comprising:

launching an optical training signal; and receiving a representation of said optical training signal through said optical medium; and wherein:
  determining said impairment information includes using said received representation of said optical training signal for calculating said impairment information.

51. An optical transmission method, comprising:

launching an optical signal having intensity levels responsive to encoded levels, said intensity levels having unequal spacings for substantially compensating for a combination of impairments including a signal independent noise, at least one signal dependent noise, and at least one of (i) a transmitter extinction ratio, (ii) an intersymbol interference, and (iii) a detection threshold ambiguity; and converting input representations of data into said encoded levels using impairment information indicative of said combination of said impairments.

52. The method of claim 51, wherein:

said at least one signal dependent noise includes a first signal dependent noise having variances substantially directly proportional to said intensity levels, respectively.

53. The method of claim 51, wherein:

said at least one signal dependent noise includes a second signal dependent noise having variances substantially proportional to squares of said intensity levels, respectively.

54. The method of claim 51, wherein:
said combination of said impairments includes both of said intersymbol interference and said transmitter extinction ratio.

55. The method of claim 51, wherein:
said intensity levels include first, second, and third said intensity levels, said first intensity level having a range of 0.001 to 0.251 of said third intensity level and said second intensity level having a range of 0.272 to 0.499 of said third intensity level.

56. The method of claim 51, wherein:
said intensity levels include first, second, third, and fourth said intensity levels, said first intensity level having a range of 0.001 to 0.251 of said fourth intensity level, said second intensity level being greater than said first intensity level and having a range of 0.124 to 0.333 of said fourth intensity level, and said third intensity level having a range of 0.458 to 0.666 of said fourth intensity level.

57. The method of claim 51, wherein:
said intensity levels include first, second, third, fourth, and fifth said intensity levels, said first intensity level having a range of 0.001 to 0.248 of said fifth intensity level, said second intensity level being greater than said first intensity level and having a range of 0.071 to 0.249 of said fifth intensity level, said third intensity level having a range of 0.261 to 0.499 of said fifth intensity level, and said fourth intensity level having a range of 0.571 to 0.749 of said fifth intensity level.

58. The method of claim 51, wherein:
converting said input representations of said data includes converting said representations of said data into said encoded levels for providing said intensity levels according to $$P_{M-1} = \frac{(M-1)C[(1+\delta)(M-1)C + 2(\rho_{ind}(1-\delta)^2 + \delta(M-1)^2 C^2)^{\frac{1}{2}}]}{(1-\delta)^2}$$

and $$P_k = (kC + \sqrt{\rho_{ind} + \delta \cdot P_{M-1}})^2 - \rho_{ind}, \ k=0 \ldots, M-2.$$

59. The method of claim 51, wherein:
converting said input representations of said data includes converting said representations of said data into said encoded levels for providing said intensity levels according to $$P_{M-1} = \frac{(M-1)C[(1+\delta)(M-1)C + 2(\rho_{ind}(1-\delta)^2 + (\delta - 4\beta\rho_{ind})(M-1)^2 C^2 + \beta(M-1)^4 C^4)^{\frac{1}{2}}]}{(1-\delta)^2 - 4\beta(M-1)^2 C^2}$$

and $$P_k = (kC + \sqrt{\rho_{ind} + \delta P_{M-1} + \beta P_{M-1}^2 + ee})^2 \rho_{ind} - \beta P_{M-1}^2, \ k=0 \ldots, M-2.$$

60. The method of claim 51, wherein:
converting said input representations of said data includes converting said representations of said data into said encoded levels for providing said intensity levels according to $$P_k^{(i)} = P_{k-1}^{(i)} + \frac{Q_k}{RG}(\sigma_k(P_0^{(i)}, \ldots, P_{k-1}^{(i)}, P_k^{(i-1)}, \ldots, P_{M-1}^{(i-1)}) + \sigma_{k-1}(P_0^{(i)}, \ldots, P_{k-1}^{(i)}, P_k^{(i-1)}, \ldots, P_{M-1}^{(i-1)}))$$

and if $$(P_{M-1}^{(i)} - P_{M-1}^{(i-1)})/P_{M-1}^{(i)} > \varepsilon, \ \text{try next } i.$$

61. The method of claim 51, wherein:
converting said input representations of said data includes converting said representations of said data into said encoded levels for providing said intensity levels according to $$P_k^{(i)} = P_{k-1}^{(i)} + \frac{Q_k}{RG}(\sigma_k(P_0^{(i)}, \ldots, P_{k-1}^{(i)}, P_k^{(i-1)}, \ldots, P_{M-1}^{(i-1)}) + \sigma_{k-1}(P_0^{(i)}, \ldots, P_{k-1}^{(i)}, P_k^{(i-1)}, \ldots, P_{M-1}^{(i-1)}))$$

and if $$(P_{M-1}^{(i)} - P_{M-1}^{(i-1)})/P_{M-1}^{(i)} > \varepsilon, \ \text{try next } i.$$

62. The method of claim 51, wherein:
converting said input representations of said data includes converting said representations of said data into said encoded levels for providing said intensity levels according to $$P_k^{(i)} = P_{k-1}^{(i)} e_k P_{M-1}^{(i-1)} + \frac{Q_k}{RG}(\sigma_k(P_0^{(i)}, \ldots, P_{k-1}^{(i)}, P_k^{(i-1)}, \ldots, P_{M-1}^{(i-1)}) + \sigma_{k-1}(P_0^{(i)}, \ldots, P_{k-1}^{(i)}, P_k^{(i-1)}, \ldots, P_{M-1}^{(i-1)}))$$

and if $$(P_{M-1}^{(i)} - P_{M-1}^{(i-1)})/P_{M-1}^{(i)} > \varepsilon, \ \text{try next } i.$$

63. The method of claim 51, further comprising:
receiving a representation of said optical signal through an optical medium; and
determining representations of said data.

64. The method of claim 63, further comprising:
determining said impairment information from said received representation of said optical signal.

65. The method of claim 64, further comprising:
communicating said impairment information for use for converting said input representations of said data into said encoded levels.

66. The method of claim 64, further comprising:
launching an optical training signal; and
receiving are presentation of said optical training signal through said optical medium; and wherein:
determining said impairment information includes using said received representation of said optical training signal for calculating said impairment information.

* * * * *